US012042794B2

(12) United States Patent
Lal et al.

(10) Patent No.: US 12,042,794 B2
(45) Date of Patent: Jul. 23, 2024

(54) PROGRAMMABLE ULTRASONIC FIELD DRIVEN MICROFLUIDICS

(71) Applicant: Cornell University, Ithaca, NY (US)

(72) Inventors: Amit Lal, Ithaca, NY (US); Adarsh Ravi, Ithaca, NY (US); Alexander Ruyack, Ithaca, NY (US); Justin Kuo, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 950 days.

(21) Appl. No.: 17/065,459

(22) Filed: Oct. 7, 2020

(65) Prior Publication Data

US 2021/0101148 A1 Apr. 8, 2021

Related U.S. Application Data

(60) Provisional application No. 62/911,938, filed on Oct. 7, 2019.

(51) Int. Cl.
*B01L 3/00* (2006.01)
*F04B 17/00* (2006.01)

(52) U.S. Cl.
CPC ..... *B01L 3/502715* (2013.01); *B01L 3/50273* (2013.01); *F04B 17/003* (2013.01); *B01L 2400/0436* (2013.01)

(58) Field of Classification Search
None
See application file for complete search history.

(56) References Cited

U.S. PATENT DOCUMENTS 6,664,104 B2 12/2003 Pourahmadi et al.
7,981,368 B2 7/2011 Laugharn et al.
(Continued)

FOREIGN PATENT DOCUMENTS

GB 2403729 A 1/2005
WO 2019/129631 7/2019
WO 2019/226862 11/2019

OTHER PUBLICATIONS

Yu, et al. "Noninvasive Acoustic-Wave Microfluidic Driver," IEEEE Xplore; Jan. 24, 2002, pp. 125-128.
(Continued)

*Primary Examiner* — Clayton E. LaBalle
*Assistant Examiner* — Diana Hancock
(74) *Attorney, Agent, or Firm* — COZEN O'CONNOR

(57) ABSTRACT

In one aspect a high frequency ultrasonic microfluidic flow control device is disclosed. The device includes an array of ultrasonic transducers arranged to direct ultrasound to a microfluidic channel. The device further includes one or more driver circuits. Each ultrasonic transducer is associated with one of the one or more driver circuits, and each ultrasonic transducer is driven by a driver signal from the associated driver circuit. The array of ultrasonic transducers and one or more driver circuits are produced in the same semiconductor fabrication process. The device further includes one or more electrical contacts associated with each ultrasonic transducer in the array if ultrasonic transducers, wherein the one or more electrical contacts associated with each ultrasonic transducer applies the driver signal from the associated ultrasonic driver circuit.

21 Claims, 30 Drawing Sheets

(56) References Cited

U.S. PATENT DOCUMENTS

| | | | | |
|---|---|---|---|---|
| 8,319,398 | B2 | 11/2012 | Vivek et al. | |
| 9,116,145 | B2 | 8/2015 | Li et al. | |
| 10,946,133 | B2 * | 3/2021 | Fiering | A61M 1/3623 |
| 2007/0122314 | A1 | 5/2007 | Strand et al. | |
| 2013/0192958 | A1 * | 8/2013 | Ding | B07C 5/3427<br>198/630 |
| 2014/0033808 | A1 * | 2/2014 | Ding | C12M 47/04<br>73/61.75 |
| 2015/0268244 | A1 * | 9/2015 | Cho | G01N 15/1433<br>435/7.23 |
| 2017/0248513 | A1 * | 8/2017 | Liu | G01N 33/1826 |
| 2019/0071627 | A1 | 3/2019 | Serex | |
| 2020/0269246 | A1 | 8/2020 | Yellen et al. | |
| 2023/0234058 | A1 * | 7/2023 | Dubay | B01L 3/50273<br>137/13 |

OTHER PUBLICATIONS

Ravi, et al. "CMOS Compatible GHZ Ultrasonic Fresnel Microfluidic Actuator," SonicMEMS Laboratory, School of Electrical and Computer Engineering, Cornell University, 4 pages.

"Valveless Microfluidic Flow Control Using Planar Fresnel Type GHz Ultrasonic Transducers" 2019 IEEE International Ultrasonics Symposium (IUS), Glasgow, Scotland, Oct. 6-9, 2019, 4 pages.

"Acousto-Optic Modulation of Water in a Microfluidic Channel Using Planar Fresnel Type GHz Ultrasonic Transducer" 2019 IEEE International Ultrasonics Symposium (IUS), Glasgow, Scotland, Oct. 6-9, 2019, 4 pages.

"Localized Microfluidic Mixer Using Planar Fresnel Type GHz Ultrasonic Transducer", IEEE, 4 pages.

* cited by examiner

CASE: 1

RF : Off

*Streamlined flow*
$Re = 0.531$

RF : On
S1(S3) and S2(S4)
Pulse $f_{rep.}$: 100kHz
Duty cycle: 50%

*Perturbation in flow due to GHz sonic waves*

Fluid flow $(U = 10\mu L/min)$

CASE: 2

RF : On
Pulse $f_{rep}$: 100kHz
Duty cycle: 10%
S1(S3): $t_{on} = 1\mu s$
S2(S4): $t_{on} = 9\mu s$

*Perturbation at T2*

RF : On
Pulse $f_{rep}$: 100kHz
Duty cycle: 90%
S1(S3): $t_{on} = 9\mu s$
S2(S4): $t_{on} = 1\mu s$

*Perturbation at T1*

$$\tau = \frac{2a^2\rho_p}{9\eta} \approx 1.5\mu s$$

CASE: 3

RF : On
Pulse $f_{rep}$: 100kHz
Duty cycle: 50%
S1(S3): $t_{on} = 5\mu s$
S2(S4): $t_{on} = 5\mu s$

*Noticeable Perturbation at T1-T3*

RF : On
Pulse $f_{rep}$: 500kHz
Duty cycle: 50%
S1(S3): $t_{on} = 1\mu s$
S2(S4): $t_{on} = 1\mu s$

*Noticeable Perturbation at T3*

$F_{drag} = 6\pi\eta aU$
Change in fluid flow rate due to streaming

PROGRAMMABLE ULTRASONIC FIELD DRIVEN MICROFLUIDICS

CROSS-REFERENCE TO RELATED APPLICATION

This patent document claims priority to and benefits of U.S. Provisional Appl. No. 62/911,938, entitled "Valveless Microfluidic Flow Control Using Planar Fresnel Type GHZ Ultrasonic Transducers," filed on Oct. 7, 2019. The entire content of the before-mentioned patent application is incorporated by reference as part of the disclosure of this document.

STATEMENT REGARDING FEDERALLY SPONSORED RESEARCH

This invention was made with government support under ECCS-1542081 awarded by the National Science Foundation (NSF). The government has certain rights in the invention.

TECHNICAL FIELD

The technology disclosed in this patent document relates to microfluidic flow control and particle manipulation.

BACKGROUND

The advancement of micro and nanoscale actuators has resulted in many capabilities to manipulate micro/nano particles and fluidic samples. Efficient microparticle and microfluidic control and manipulation are useful in many chemical, bio-medical and biological applications. Among the contactless manipulation mechanisms, optical and acoustic techniques are the most common. However, higher forces and the capability to perturb an otherwise laminar flow of fluids without any restrictions on their physical properties make acoustofluidics advantageous. New techniques and devices are needed for microfluidic flow control.

SUMMARY

Disclosed are new techniques and devices for microfluidic flow control including pumps, mixers, and ultrasonic valves. The disclosed techniques and devices enable integrated control circuits and microfluidic devices using a semiconductor process.

The disclosed subject matter includes a localized microfluidic flow control using a linear array (e.g., 1×4) of Fresnel type gigahertz (GHz) ultrasonic transducers. These devices are fabricated in a planar semiconductor fabrication process which decouples the fluidics from the electrical interconnects side of an aluminum nitride based transducer enabling easier integration of GHz transducers and fluidics in a distributed manner. Streaming vortices generated by high frequency focused bulk acoustic waves from Fresnel transducers perturb the laminar nature of the microfluidic flow in the channel. By electronically controlling the on and off times of radio frequency (RF) signal inputs to the Fresnel transducers, fluidic steaming can be localized. Changes in the path of polystyrene microbeads in water that were pumped into the microchannel indicate changes in the fluidic forces acting on them due to acoustic streaming and change in the flow velocity.

The disclosed subject matter includes acousto-optic modulation at GHz frequencies in water in a microfluidic channel. The photoelastic effect in water is induced by a silicon based GHz bulk acoustic wave aluminum nitride transducer placed in a Fresnel lens configuration. Planar GHz ultrasonic transducers can be fabricated is a complementary metal oxide semiconductor (CMOS) compatible semiconductor fabrication process with no thin-film release step enabling easier integration with CMOS and microfluidics. A UHF vibrometer which is sensitive to changes in the refractive index along the laser path can be used to measure the peak surface displacement. In an example embodiment, the peak refractive index change was determined to be 0(10−6), when 1.08 GHz RF drive voltages between 1 Vp and 5 Vp were applied to the focusing transducer. Peak phase modulation of 6 mrad was determined from experimental results for 5 Vp RF drive signal. The total modulator area of such a system is 0.086 $mm^2$. This result provides a framework to implement CMOS integrated acousto-optic modulator arrays.

The disclosed subject matter includes a microfluidic mixer that uses focused GHz ultrasonic waves to create streaming vortices in an otherwise laminar fluidic flow. Due to high absorption and small wavelength at gigahertz frequencies, mixing activity is localized. Ultrasonic focusing can be achieved using an aluminum nitride based bulk acoustic wave transducer placed in a Fresnel lens configuration on a silicon substrate. Further, the transducer is on the opposite side of fluidics thereby enabling easier integration of transducers and fluidics in a distributed manner. In an example embodiment, experimental results show microfluidic mixing of blue dye and water had 90% efficiency, when the transducer was driven by a 1.06 GHz continuous wave RF signal of 20 dBm power.

The disclosed subject matter includes an aluminum nitride based GHz frequency ultrasonic transducer to realize a microfluidic actuator using acoustic radiation force and acoustic streaming. The transducer can use focusing transducers placed in a Fresnel lens configuration, which generates bulk acoustic waves through the silicon substrate adding in phase at the focus. In an example embodiment, peak displacement of 250 pm was achieved at the focus with a driving signal at a frequency of 1.06 GHz and 5V amplitude input. Acoustic vortices can be formed with microfluidic streaming velocity >2.6 mm/s in water droplets placed on top of the transducer.

In one aspect a high frequency ultrasonic microfluidic flow control device is disclosed. The device includes an array of ultrasonic transducers arranged on a first side of a complementary metal oxide semiconductor (CMOS) substrate, wherein the array of ultrasonic transducers is configured to direct ultrasonic energy into a microfluidic channel, and wherein the microfluidic channel is structured on a second side of the CMOS substrate. The device further includes one or more driver circuits arranged on the first side of the CMOS substrate, wherein each ultrasonic transducer is operatively associated with one of the one or more driver circuits, wherein each ultrasonic transducer is driven by a driver signal from the associated driver circuit, and wherein each ultrasonic transducer is configured to produce ultrasound in response to an electrical driving signal at a frequency above 100 MHz. The device includes one or more electrical contacts associated with each ultrasonic transducer in the array of ultrasonic transducers, wherein the one or more electrical contacts associated with each ultrasonic transducer is configured to apply the driver signal from the associated driver circuit.

In another aspect, a method of microfluidic flow control is disclosed. The method includes focusing ultrasonic energy, from one or more ultrasonic transducers in an array of ultrasonic transducers, onto a microfluidic channel, wherein each ultrasonic transducer is configured to produce ultrasound in response to an electrical driving signal at a frequency above 500 MHz. The method further includes driving each of the one or more ultrasonic transducer in the array of ultrasonic transducers by a different driver circuit to cause a change in microfluidic flow in a channel according to a valve, a pump, or a mixer.

BRIEF DESCRIPTION OF THE DRAWINGS

FIG. 17B depicts a comparison of peak phase difference as a function of applied RF voltage obtained from the approximate analysis and from.

DETAILED DESCRIPTION

Figure 1A:
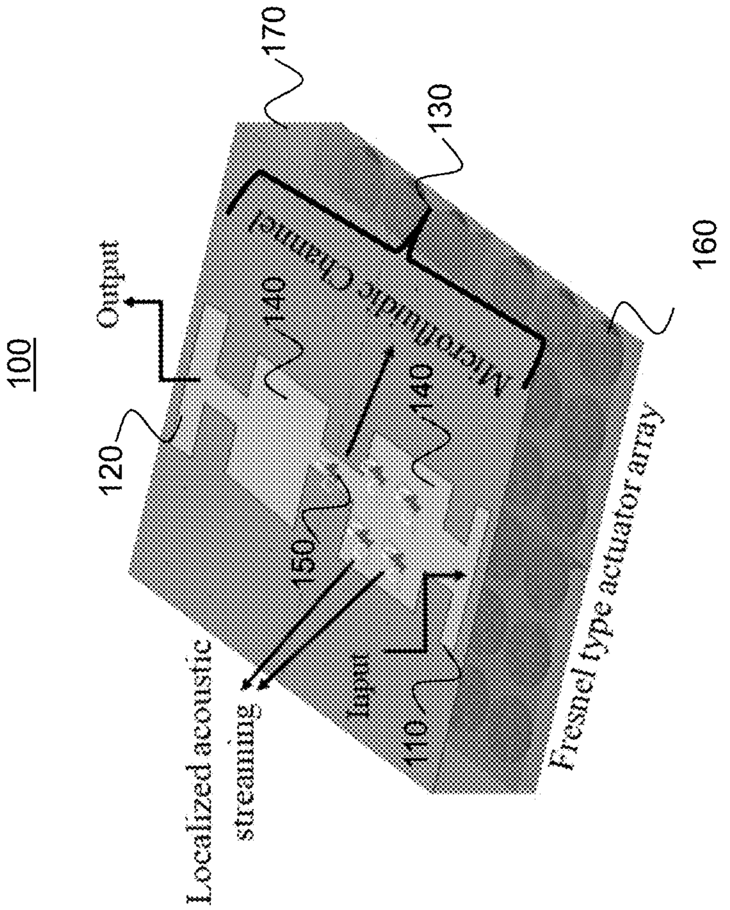
FIG. 1A depicts an example of a microfluidic pump including a Fresnel-type actuator array and a microfluidic channel on the receive side of the array.

Section headings are used in the present document only for ease of understanding and do not limit scope of the embodiments to the section in which they are described.

Disclosed in this patent document are new techniques and devices for microfluidic flow control including pumps, mixers, and ultrasonic valves. The disclosed techniques and devices enable integrated control circuits and microfluidic devices using a semiconductor process. These integrated microfluidic and electrical devices are well suited for applications such as clinical or home-use assays and handheld devices that are battery powered to enable ease of use in small clinics or at home. In previous technologies, pumps and valves have take up considerable volume and prevent the size, weight, and power of microfluidic assays from being compatible with ease of patient use. In order to make assays portable, many previous solutions forgo the use of pumps and valves, and use passive effects such as surface tension driven flows to implement assays which prevent more complex microfluidic functions such as mixing and valving of reagents. The disclosed in-situ devices provide local sensing and actuation and eliminate the need for off-chip computing and control elements, further miniaturizing and enhancing the capabilities of the microfluidic system. Computational elements can be integrated into the devices that, for example, take sensed data, process the sensed based, and learn from past sensing elements to determine the aging of the fluidic system. These computational elements are implemented in the same semiconductor as the microfluidic such as a complementary metal oxide semiconductor process (CMOS). In some example embodiments, ultrasonic and acoustic fields are high intensity ultrasonic fields that generate high efficacy mixing, pumping, trapping, and sorting of particles. This high intensity ultrasound can be generated by summing up the acoustic field from an array of transducers/actuators driven the integrated CMOS driver circuits.

INTRODUCTION

Acoustic waves propagating through a medium carry energy and momentum. When these waves propagate from a solid to a liquid medium, energy is dissipated into the liquid due to absorption and diffraction. As a result, momentum is transferred to the liquid. When the wave in the liquid encounters a particle, scattering and net radiation forces can move the particle, and the attenuation of the wave causes streaming.

Acoustic streaming is a flow generated by a force arising from the presence of a gradient in the time-averaged acoustic momentum flux in the medium. The absorption in the oscillatory field brings about a gradient in the flow field. As the absorption coefficient, a increases nonlinearly with frequency, f. For example, in water, the absorption can be expressed as $\alpha=\alpha_0 f^2$. Since the absorption at higher frequencies occurs at much smaller distances owing to higher absorption, the gradient of the field into the liquid is higher. Hence, the high-frequency sonic waves induce streaming vortices to a greater extent, compared to low frequency transducers.

High frequency electrical to acoustic transduction is based on surface acoustic wave (SAW) or bulk acoustic wave (BAW) technologies. These devices can be fabricated on substrates such as zinc oxide, lead zirconate titanate (PZT), lithium niobate, lithium tantalate and silicon, and may require higher input voltages for transduction. However, most of these approaches are not CMOS compatible due to the usage of non-CMOS compatible materials such as zinc oxide, PZT, lithium niobate and lithium tantalate. Furthermore, in these traditional BAW or SAW based acoustofluidic devices, the fluid is placed on the same side of the substrate as the transducers. Thus, considerable chip area needs to be dedicated to isolate electrical interconnects from the fluidic samples. All these factors lead to increased device area, expense of fabrication, and complexity of electronics required to generate and amplify high voltages at ultra-high frequencies.

In this patent document, disclosed are valveless localized flow control and manipulation using a closely spaced linear array of GHz Fresnel-type focused ultrasonic transducers. By valveless, we mean that no mechanical devices are used as valves. As detailed in this patent document, the ultrasonic transducers may act like a valve by preventing flow through a channel. The planar device can be fabricated using CMOS compatible materials such as aluminum nitride solidly mounted to silicon substrate. Furthermore, the devices can operate at CMOS compatible RF power and the fluidics are placed on the opposite side of transduction, enabling easier integration of distributed, yet closely spaced ultrasonic transducers and microfluidics. As an illustrative example, ultrasonic transducers in an array of ultrasonic transducers may be 40μ×40μ or 50μ×50μ in size with a gap between ultrasonic transducers of between 2μ and 50μ. Other transducer sizes and gaps can also be used.

Material and Methods I

FIG. 1A depicts an example of a microfluidic device 100 including a Fresnel-type actuator array and a microfluidic channel on a receive side of the array, in accordance with some example embodiments. In the example of FIG. 1A, a microfluidic channel 150 has a fluidic input port 110 and fluidic output port 120. The microfluidic channel 150 includes sections of channel that may perform different functions such as mixing, pumping, or valving. These functions are performed due to the array of ultrasonic actuators 160 which are each electrically driven by a driver circuit to cause the array of actuators to perform the function. For example, the array of actuators 160 may be driven to cause fluidic sections 140 to cause fluid to be pumped from the input port toward the output port. In another example, the array of actuators 160 may be driven to cause fluidic sections 140 to cause fluid to be mixed in those sections. In another example, the array of actuators 160 may be driven to cause microfluidic channel 150 to cause a valving function to occur such that when the array of actuators 160 is electrically driven with a selected electrical signal, microfluidic channel 150 acts as a valve to prevent fluid flow through microfluidic channel 150, and when the array of actuators 160 is not electrically driven with the selected electrical signal, microfluidic channel 150 acts as a valve to allow fluid flow through microfluidic channel 150. The fluidic elements 110, 120, 130, 140, and 150 can be fabricated on the backside of substrate 170 in a complementary metal oxide semiconductor fabrication process or another semiconductor process such as gallium arsenide (GaAs), silicon germanium (SiGe), or other process. On the frontside of the substrate 170, the ultrasonic actuators and driver circuits can be fabricated. In this way, an integrated microfluidic device including fluidic channels, ultrasonic devices, and driver circuits for the ultrasonic devices can be fabricated in a single inexpensive process.

Figure 1B:
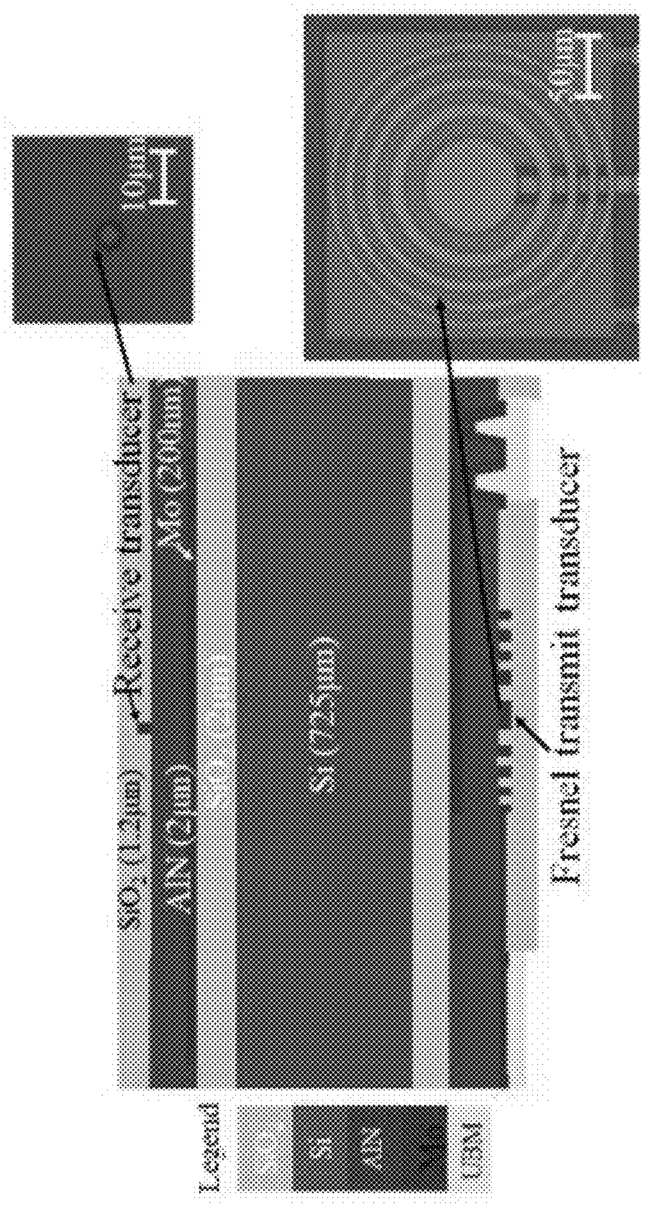
FIG. 1B depicts an example cross-sectional schematic of the structure of an aluminum nitride silicon (AlN—Si) stack with images of a Fresnel-zone plate transmit and circular receive transducers after fabrication.

FIG. 1B depicts an example cross-sectional schematic of the structure of an AlN—Si stack with images of a Fresnel-zone plate transmit and circular receive transducers after fabrication. The Fresnel zone plate transducers are spaced such that the intensity of the ultrasound at a given frequency is added in phase to achieve the very high displacements and velocities needed for nonlinear microfluidic forces to be generated. The electrodes on the transmit side of the silicon substrate can be patterned in Fresnel zone plate (FZP) configuration in order to focus the acoustic field emanating through the silicon substrate onto the opposing receive side. The receive electrode can be patterned to form a circular transducer of 2 μm radius. In an example embodiment, the outermost radius of the Fresnel type transducer was 165 μm. The resonant frequency of the transducer in this example embodiment was 1.08 GHz. As the frequency is increased above 100 MHz, ultrasonic transducers can be made smaller and placed closer together without the ultrasound produced by the ultrasonic transducers interacting such as by diffraction.

Figure 2A:
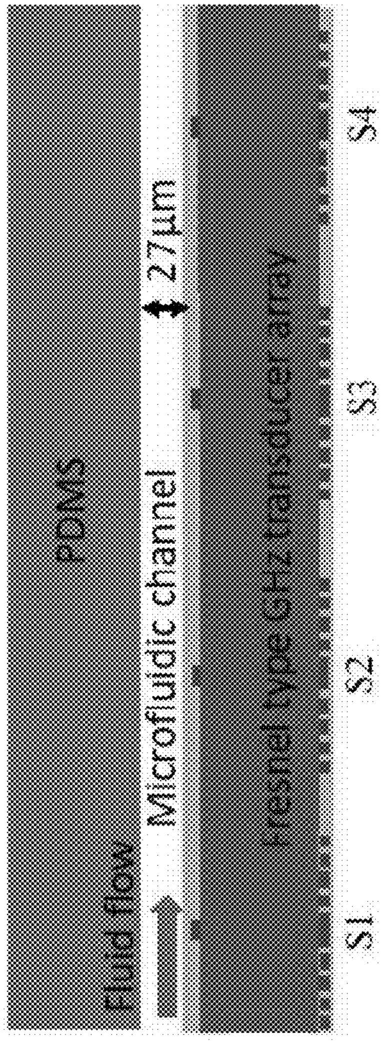
FIG. 2A depicts a cross-sectional schematic of a structure of an example linear array Fresnel type transducer stack with a polydimethylsiloxane (PDMS) microchannel.
Figure 2B:
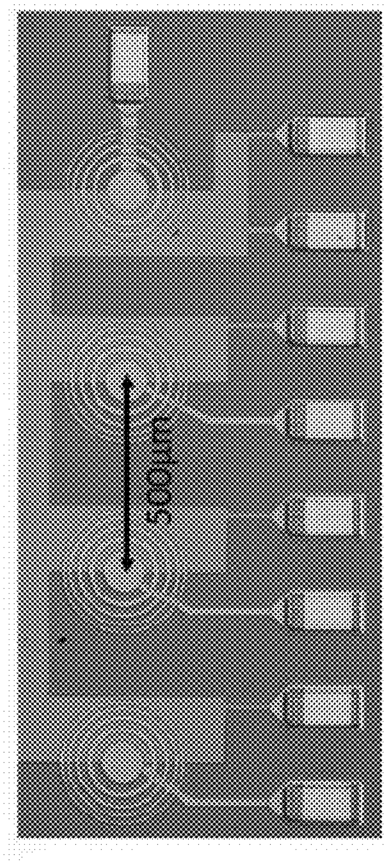
FIG. 2B depicts an example image of a fabricated 1×4 Fresnel type transmit transducer array.

FIG. 2 shows an example of a 1×4 linear array of the Fresnel type transducers that are spaced 500 μm apart center-center. A PDMS microchannel can be bonded such that it encloses the four receive transducers.

Figures 3A, 3B, 3C, 3D, 3E, 3F, 3G:
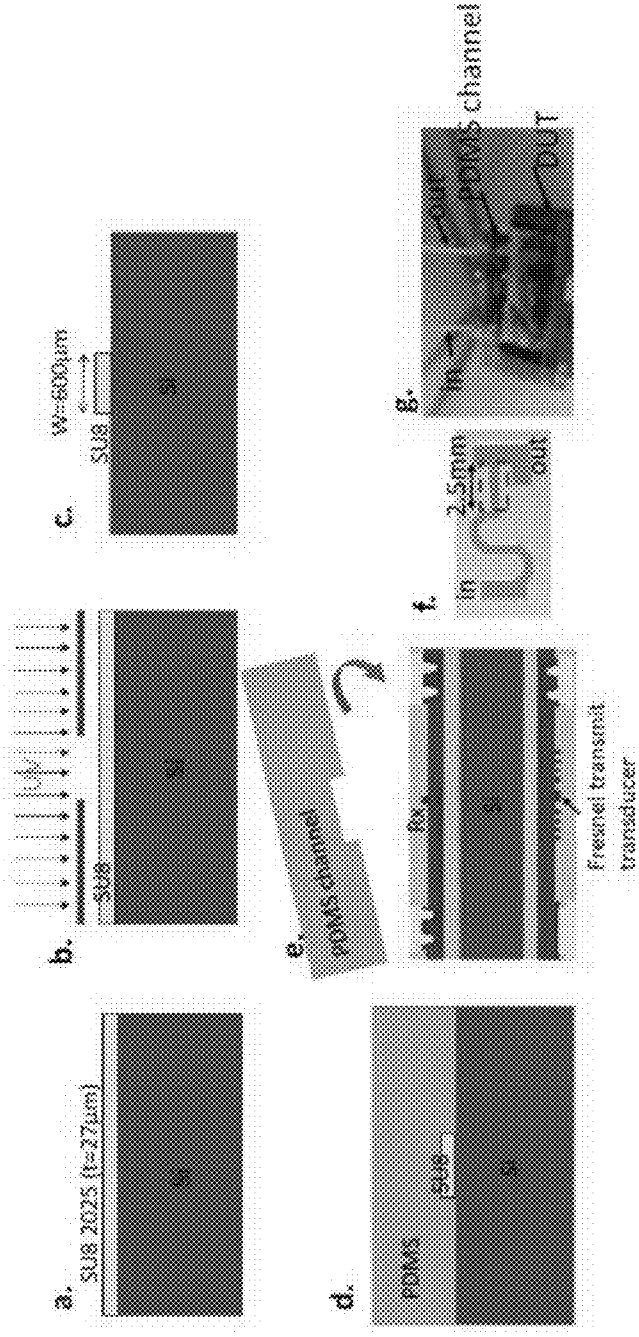
FIGS. 3A-E depict an example process flow used to fabricate and bond a microfluidic channel, in accordance with some example embodiments.
FIG. 3F depicts an example image of a SU8 mold used to create the channel.
FIG. 3G depicts an example image of the bonded acoustofluidic device.

In some example embodiments, a PDMS microfluidic channel has one inlet port and an outlet port which may be fabricated using a soft lithography process. The molds for the PDMS channel can made using a photoresist (e.g., SU8 2025) spun onto a clean silicon wafer. The photo resist can be patterned using UV contact lithography to make a 600 μm wide channel. PDMS may be made by mixing Sylgard 184 silicone elastomer base and a curing agent in the mass ratio 10:1 which can be peeled off from the silicon wafer and cut to make a microfluidic channel. The PDMS channel can then be bonded onto the device. An example fabrication process flow is shown in FIGS. 33A-E. For example, a 27 μm thick SU8 mold on Si wafer is shown in FIG. 3F. FIG. 3F depicts an example image of a SU8 mold used to create the channel. The dashed box shows the region of overlap between the channel and the receive transducers.

Figure 4:
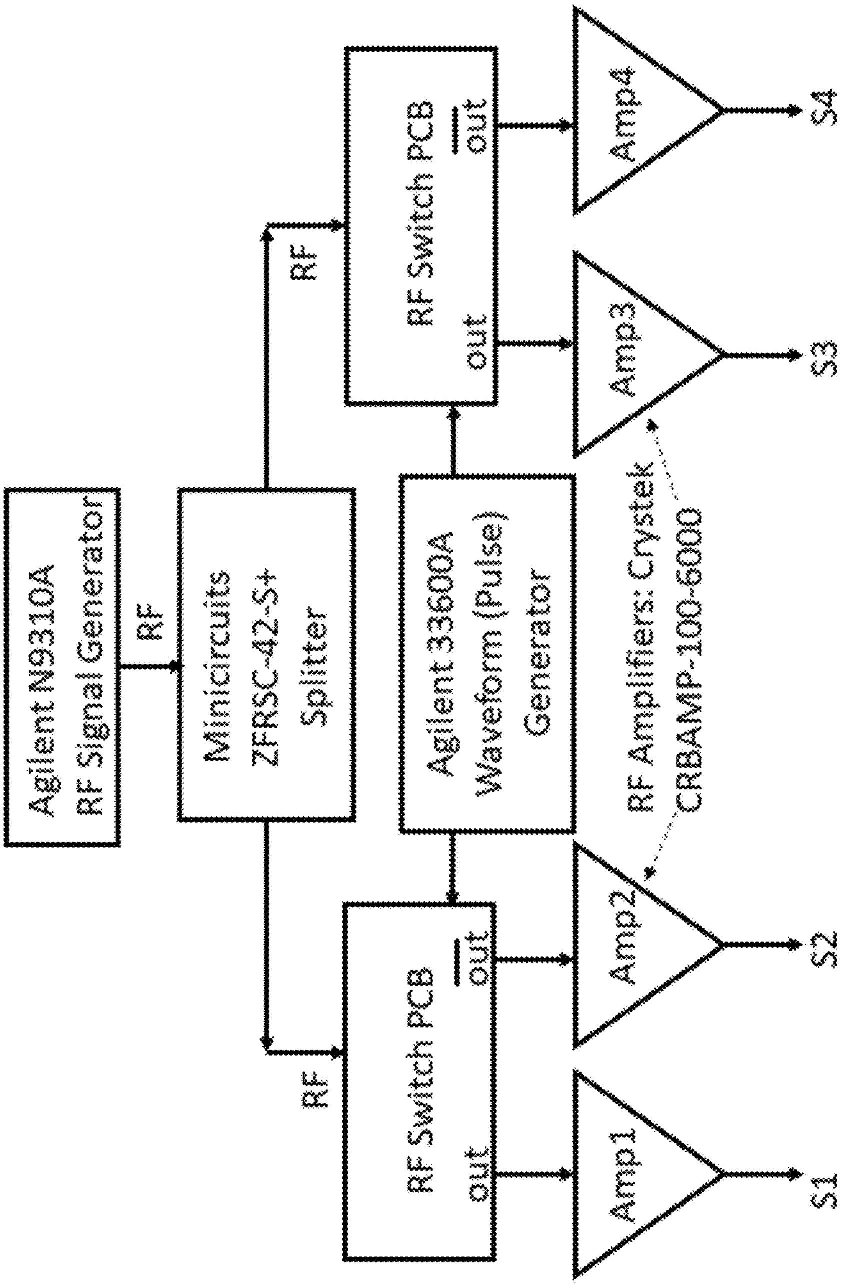
FIG. 4 depicts an example block diagram of electronic components used to generate pulsed RF input signals to drive an acoustofluidic device.

FIG. 4 depicts an example block diagram of electronic of a circuit designed to generate pulsed RF input signals to drive acoustofluidic devices via signals S1-S4. The two outputs from the waveform generator can be identical. The signal generator and waveform generator outputs can be synchronized. The signals S1 and S3 can be identical, and the signals S2 and S4 signals can be identical. For example, pulsed RF input signals (S1-S4) to the Fresnel type transmit array can be generated using an Agilent N9310A RF signal generator and/or an Agilent 33600A waveform generator. The output from the RF signal generator can be about 20 dBm. Since the RF signal outputs S1-S4 may not be matched to the impedances of the transducers, the actual RF inputs to each of the transmit transducers may be <19 dBm.

Experiments and Results I

The Fresnel type transducer can be characterized using a vibrometer (e.g., Polytec UHF-120) prior to bonding the PDMS channel. A continuous wave signal from the vector signal generator can be applied to the Fresnel type transmit transducer. With the drive voltage at $5V_{peak}$, the frequency was varied from 1.01 GHz to 1.1 GHz to determine the resonant frequency. Maximum displacement was observed at 1.08 GHz. The region around the small circular receive transducer was then scanned to observe focusing due to the Fresnel type transmit transducer.

Figure 5B:
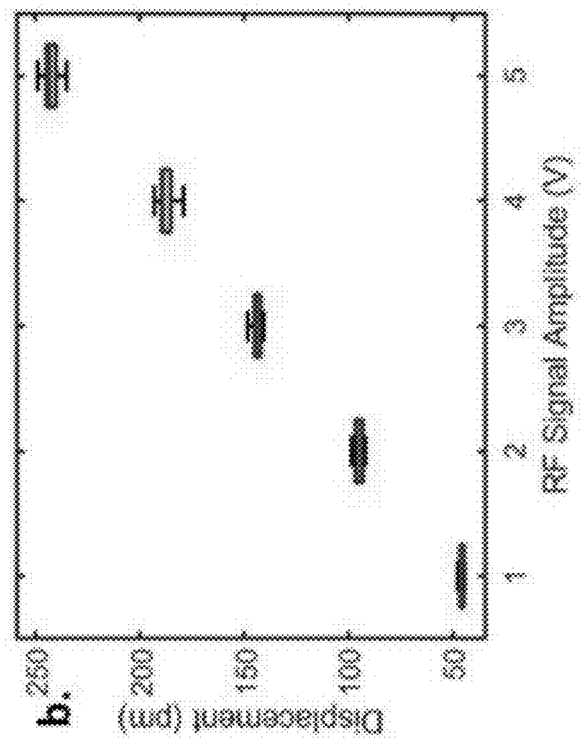
FIG. 5B depicts an example of a box plot of peak displacement at the focus for different applied voltages.
Figure 5A:
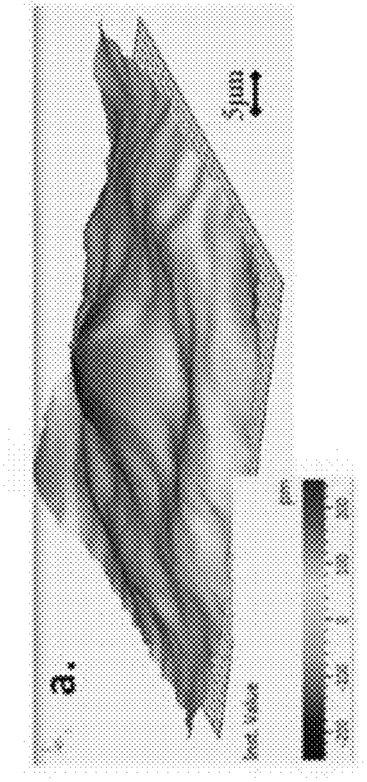
FIG. 5A depicts an example of a scanned surface displacement profile at the region around a receive transducer.

FIG. 5A depicts an example of a scanned surface displacement profile at the region around a receive transducer for $5V_{peak}$ RF continuous wave (CW) input. FIG. 5B depicts an example of a box plot of peak displacement at the focus for different applied voltages (twenty data points are plotted for each voltage). The results show focusing at the location of the receive transducer with a beam width ~10 μm. Peak surface displacement (u) at the focus was recorded for different RF drive voltages. A linear behavior of displacement with the applied continuous wave RF input voltage was observed. The average intensity at the point of focus at the receive side was calculated from $$I_{avg}=0.5\rho c v^2, \quad \text{EQ. (1)}$$

where, v=μω is the particle velocity of a harmonic system, c is the speed of sound in the medium, and ρ is the material density. For a drive voltage of 5 Vp, the average intensity was calculated to be 1.65 kW/cm$^2$ on the silicon dioxide surface located on the receive side. However, upon coupling to a liquid, the intensity would decrease as $I_{avg\ liquid}=T\ I_0e^{-2\alpha x}$, where T is the transmission coefficient of the wave in the liquid. The transducer array was then bonded to the PDMS channel as described in the previous section. In some example embodiments, ultrasound intensities generated by the ultrasonic transducers of between watts per square centimeter and 1-2 kilowatts per square centimeter can be sufficient to cause nonlinear effects in the fluid depending on the specific fluid used.

DI water with 2 μm polystyrene beads can be pumped into the microchannel at a constant flow rate of 10 μL/min using a syringe pump. Polystyrene beads were added to observe the change in the fluidic path due to the generation of acoustic streaming in the channel when the acoustic transducers were excited with the pulsed RF signals.

Figure 6:
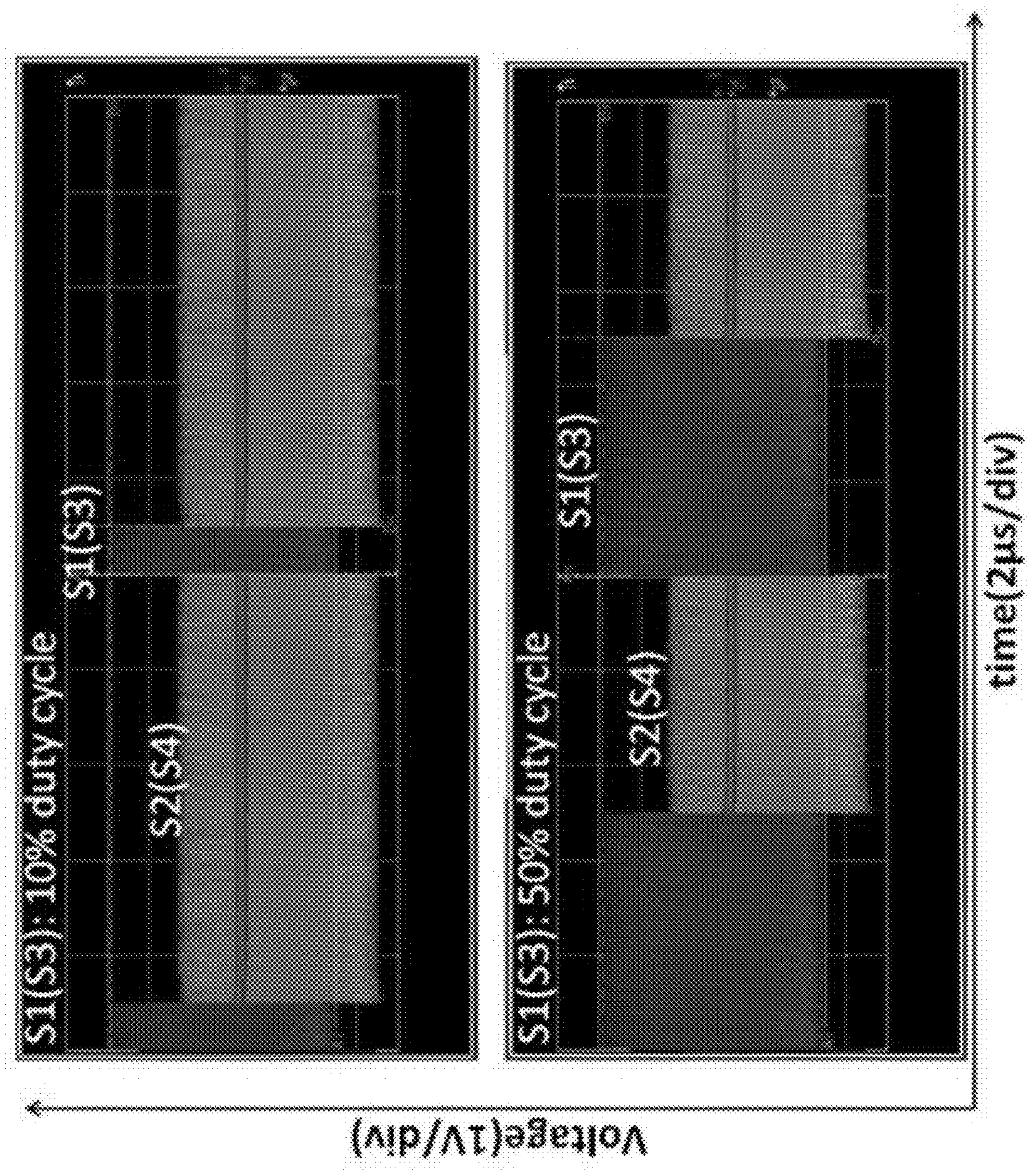
FIG. 6 depicts an examples of a pulsed RF signal used for driving an ultrasonic transducer.

Pulsed RF signals (S1-S4) were applied to the Fresnel type transducer array, such that the alternate transducers were excited by signals of the same phase, repetition frequency and duty cycle. The signals to the other pair of transducers were similar but complements to that of the first pair. Generated pulsed RF signals S1 and S2 acquired from an Agilent DSO9404A oscilloscope are shown in FIG. 6, indicating their complementary nature. FIG. 6 at the top depicts an example of a pulsed RF signal S1(S3) of 10% duty cycle and S2(S4) of 90% duty cycle, at the bottom a pulsed RF signal S1(S3) of 50% duty cycle and S2(S4) of 50% duty cycle. Pulse repetition frequency may be set to 100 kHz, and RF signal was 1.08 GHz. Signals are slightly offset in the images to indicate non-overlapping and complementary behavior. The signals were ~5.4 Vpp.

While the continuous wave RF input from the RF signal generator can be fixed at 1.08 GHz, the parameters of the pulsed wave output of the waveform generator can also be varied. In some experiments, the pulse repetition frequency was varied from 100 kHz to 500 kHz, and the signal duty cycle was changed to 10%, 25%, 50%, 75% and 90% keeping the repetition frequency constant at 100 kHz.

The acoustofluidic device was placed under a high-speed microscope (e.g., Keyence VW9000/VH-Z100R) to capture the fluidic flow due to perturbation from the Fresnel-type transducers. Initially, flow conditions were captured when the RF input to the transducers were off. Streamlined flow was observed in the channel. This is because, for a microchannel of height 27 μm and width 600 μm with flow rate of water 10 μL/min, the flow velocity (U) and the Reynolds number (Re) given by (2) are 10.18 mm/s and 0.531 respectively. The symbols: ρ denotes fluid density and η is the fluid viscosity $$Re=\rho Ul/\eta \quad \text{EQ. (2)}$$

Figure 7A:
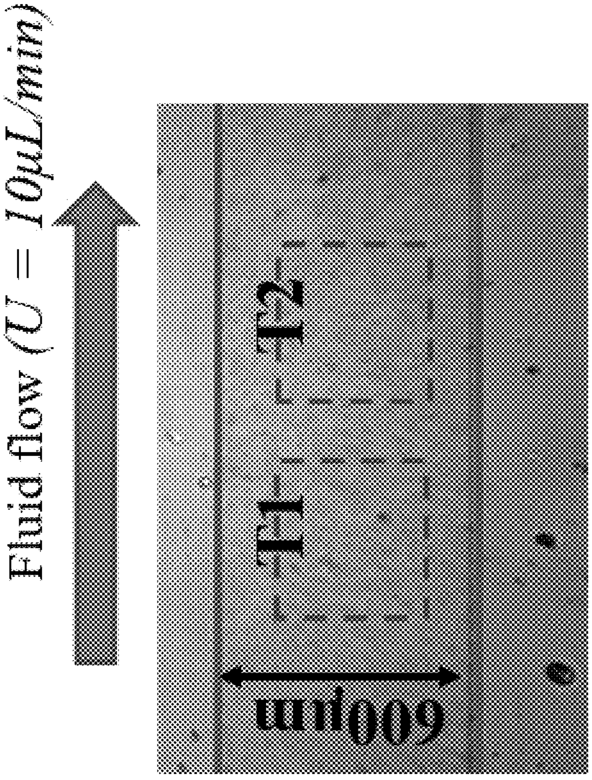
FIG. 7A shows an example of an RF input to a transducer that is off causing a negligible change in particle path in the channel.
Figure 7B:
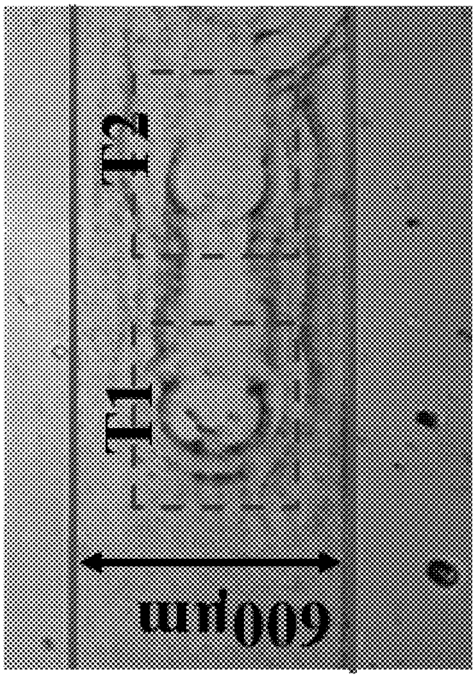
FIG. 7B shows an RF input to a transducer that is at 50% duty cycle.
Figure 7C:
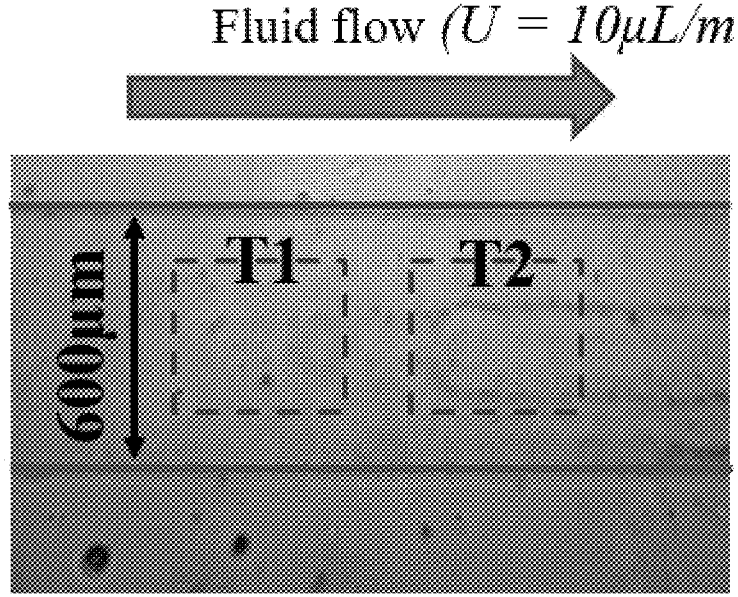
FIG. 7C shows an RF input to T1 that is on 10% of the time and input to T2 that is on 90% of the time.
Figure 7D:
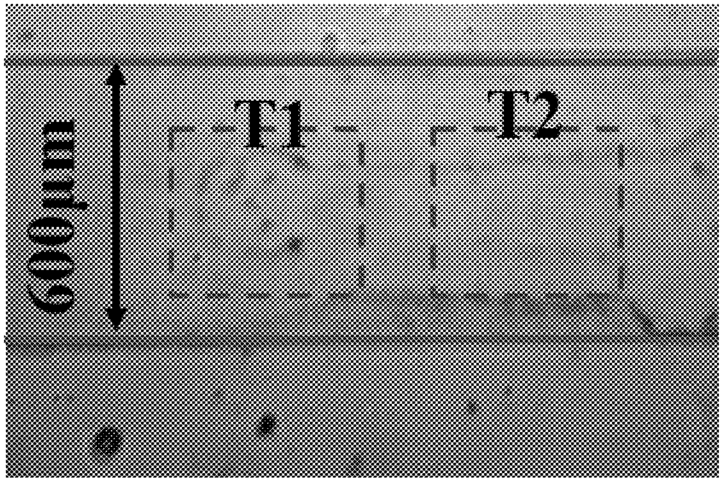
FIG. 7D shows an RF input to T1 that is on 90% of the time and input to T2 that is on 10% of the time.

Then, the pulse repetition frequency was set to 100 kHz and the duty cycle was 50%. Changes in the flow were observed in the channel due to acoustic streaming generated by the GHz sonic waves. The duty cycle of the pulse was changed keeping the repetition frequency constant at 100 kHz. When the on-time of transducers were 10% of the pulse period ($t_{on}$=1 μs), a negligible change in the fluid flow near those transducers was observed. However, changes in the particles' path were observed around transducers that were on for 90% of the cycle (ton=9 μs). This is because the characteristic time of the 2 μm microbeads is about 1.5 μs. The characteristic time, ($\tau_p$) for Stokes particles in a flow is given by:

$$\tau_p=(2a^2\rho_p)/(9\eta) \quad \text{EQ. (3)}$$

where, a and $\rho_p$ are the radius and density of the particle. FIGS. 7A-7D show image captures of the fluid flows around receive transducers 1 and 2 of the 1×4 array when the RF input was off, at 50%, 10% and 90% duty cycles. FIGS. 7A-7D depict example images of the flow inside 600 μm wide, 27 μm high microchannel at different RF input conditions. FIG. 7A shows an RF input to transducers was off negligible change in particle path in the channel. FIG. 7B shows at 50% duty cycle. FIG. 7C shows an RF input to T1 is on 10% of the time and input to T2 is on 90% of the time. FIG. 7D shows an RF input to T1 is on 90% of the time and input to T2 is on 10% of the time. Notice negligible change in particle path lines when transducers (T1 or T2) are on for $<\tau_p$. Dashed red boxes show location of streaming activity around transducers T1 and T2 of the 1×4 array.

The pulse repetition frequency can be changed to 500 kHz ($<\tau_p$ of the microbead) with the duty cycle of the pulse set to 50%. Similar flow conditions as that of the case when the RF signal input was pulsed for 10% duty cycle were observed with 100 kHz repetition frequency. However, the path lines of the microbeads around T3 location seemed to be more perturbed than that at T1 and T2. Comparing this image with that of the case where RF pulse condition was 50% duty cycle and 100 kHz repetition frequency, we can deduce that the flow rate changed as the microbeads traveled across transducers. Because of the change in flow velocity in the channel, the drag forces acting on the microparticles would have also changed. The drag force acting on a spherical particle is given by:

$$Fd_{rag}=6\pi\eta aU \quad \text{EQ. (4)}$$

The change in fluidic flow rate is due to fluidic streaming generated by the GHz focused ultrasonic beam. At higher frequencies, attenuation in fluids play a key role as the attenuation coefficient, $\alpha(f)=\alpha_0 f^2$, is a strong function of frequency. In pure water, the characteristic attenuation length, $\alpha^{-1}$, is about 30 μm at 1.08 GHz and 20° C. temperature. Previously we measured streaming velocities of >2.6 mm/s for 5 Vp continuous wave RF drive voltage. Using these Fresnel transducers, we also showed mixing of blue dye and water. Such a device could find use as a micro-pump provided the channel is optimized for fluidic resistance and backpressure.

Figure 8A:
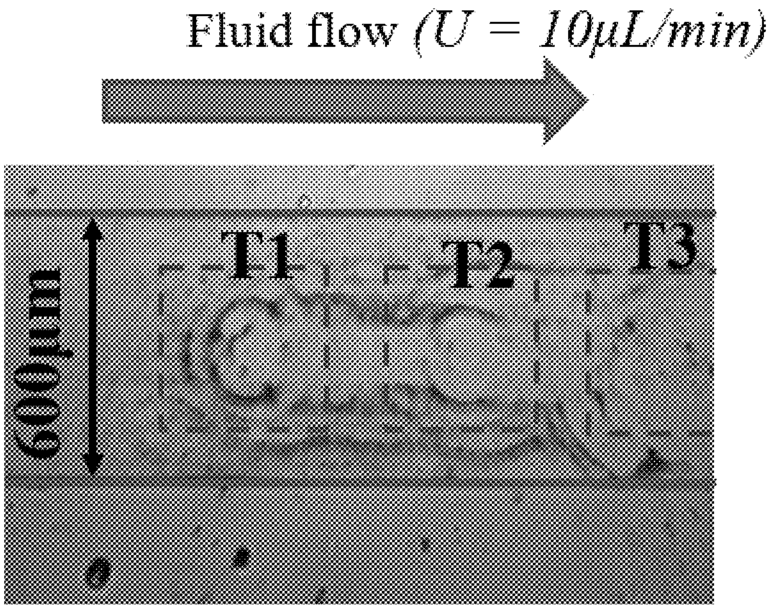
FIGS. 8A and 8B depict example images of the flow inside 600 μm wide, 27 μm high microchannel at different RF pulse repetition frequencies showing pronounced change in path lines of the microbeads.
Figure 8B:
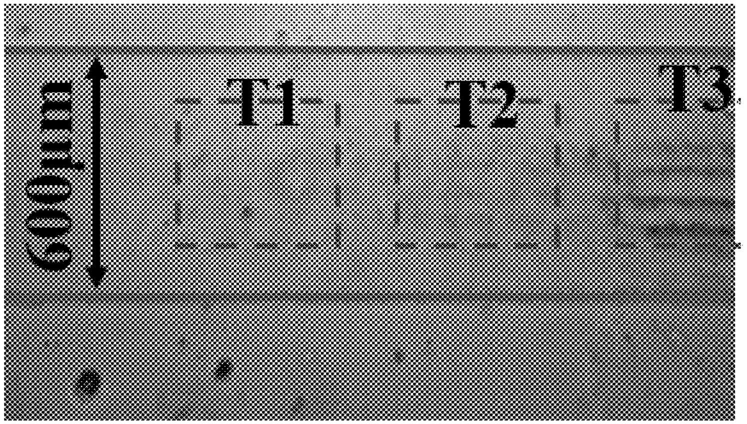

FIG. 8 depicts example images of the flow inside 600 μm wide, 27 μm high microchannel at different RF pulse repetition frequencies showing a change in path lines of the microbeads near transducer T3 indicating changes in the drag forces acting on the particles due to streaming induced change in flow velocity. At (a), for a pulse repetition frequency of 100 kHz and 50% duty cycle. At (b) for pulse repetition frequency of 500 kHz and 50% duty cycle. The dashed boxes show location of fluidic activity around transducers T1, T2 and T3 of the 1×4 array.

Figure 9:
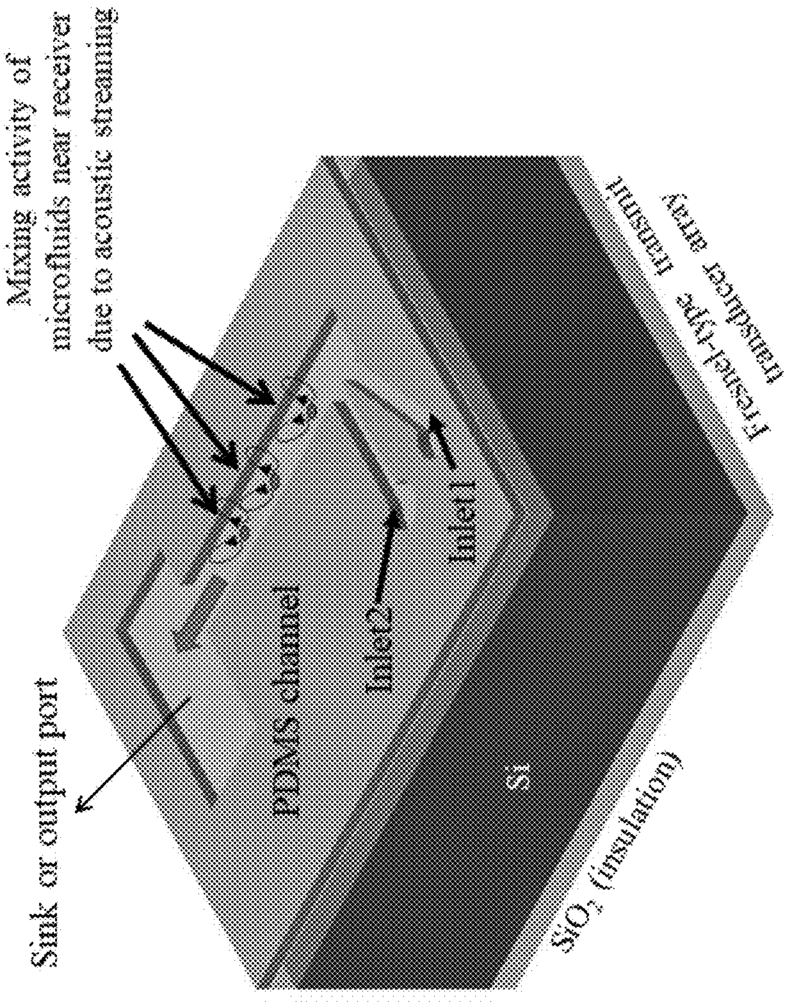
FIG. 9 depicts example image of microfluidic mixer comprising an array of Fresnel-type actuators.

FIG. 9 depicts example image of microfluidic mixer consisting of an array of Fresnel-type actuators.

Figure 10:
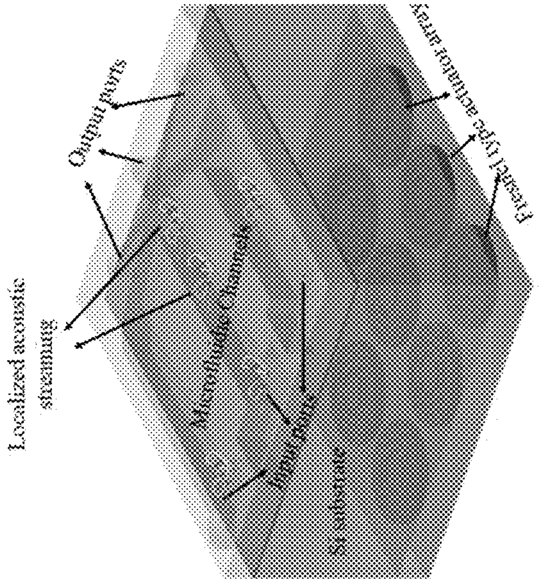
FIG. 10 depicts an example of a side view of a two-dimensional array of Fresnel-type actuators with microfluidic channels comprising multiple input and output ports capable of various functionalities such as localized mixing, pumping, and particle trapping.

FIG. 10 depicts an example of a two-dimensional array of Fresnel-type actuators with microfluidic channels consisting of multiple input and output ports capable of various functionalities such as localized mixing, pumping, and particle trapping.

Figure 11:
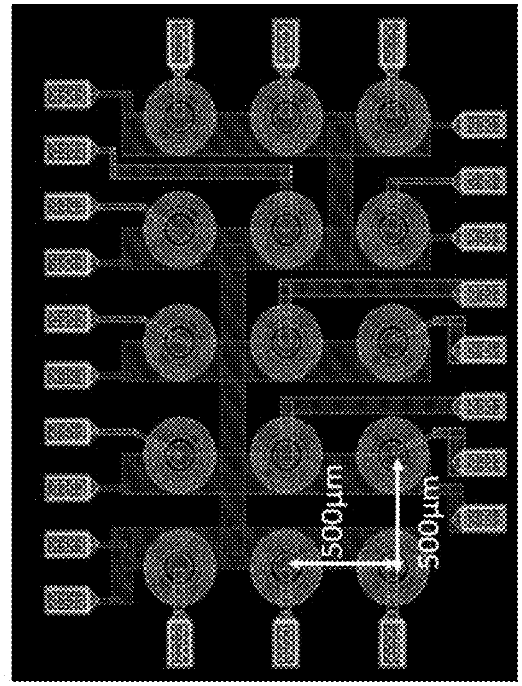
FIG. 11 depicts an example of a 3×5 array of individually addressable Fresnel-transducers.

FIG. 11 depicts an example of a 3×5 array of individually addressable Fresnel-type transducers (right).

Valveless localized flow control and manipulation of microfluidics using a closely spaced array of GHz Fresnel-type focused ultrasonic transducers are described in this patent document. In some example embodiments, an acoustofluidic transducer is planar and CMOS compatible making it easier to integrate with fluidics and CMOS electrical circuits.

The high attenuation at GHz frequency and focused ultrasonic beam generate strong and localized streaming force in the liquid. This perturbation can be used to manipulate microparticles, induce mixing of fluids and control the flow of fluids. The mixing and flow control does not depend on the electrical properties of the fluid such as the conductivity of the fluid or the dielectric properties of the fluid.

With proper electrical matching of the electrical circuits to the Fresnel-type transmit transducers, more efficient streaming activity can be observed. Further, upon optimizing the channel dimensions for backpressure, resistance and its placement around the receive transducers, the transducer array can be used as a valveless acoustic micropump.

Integrated CMOS-acoustofludic devices are enabled by the disclosed fabrication process and the RF input power for transduction, and the fluidic systems being decoupled from the electrical interconnects. Such a device will reduce the size and cost of the test setting drastically, and can enable digital control and automation of bio-chemical analytes in a closed lab-on-chip environment.

Acousto-Optic Modulation of Water Using Planar Fresnel GHz Ultrasonic Transducer Interaction between light and matter have been used in several applications including electrical signal processing, and to study properties of various physical, chemical and biological samples. Modulation of light due to such interactions can be achieved using photoelastic, electro-optic, thermo-optic and Faraday effects. However, most of these effects are observable only in certain materials, and the coefficients that relate to the change in the optical parameter under study with the applied energy, is higher in the case of photoelastic effect.

The photoelastic or piezo-optic effect is observed when the strain due to the propagation of sound causes a change in the atomic lattice spacing thereby changing the dielectric constant and the refractive index of the medium. The photoelastic effect is used in a number of acousto-optic devices such as modulators, deflectors, variable delay lines, analyzers and tunable optical filters.

Light wave propagating in a medium perturbed by sound waves gets scattered. The interaction is usually categorized into three cases based on the physical conditions of the light and sound waves. When the width of the light beam is lesser than the wavelength of the sound waves in the medium, just bending of light is observed due to the slow variation of the refractive index. When the width of light beam is greater than the acoustic wavelength, periodic variation of the index can generate light beams of different frequencies at different angles. Such interaction occurs under Raman-Nath conditions. In the third case, known as Bragg diffraction, light beam incident at a particular angle of incidence into a medium perturbed by acoustic waves, reflects off the moving diffraction grating and emerges as a single diffracted light beam. These scattering effects are pronounced when the acoustic wavelength is comparable to that of the light, allowing the latter two phenomena useful for characterizing properties of solids and liquids, modulating the intensity and phase of light, imaging acoustic fields, correlating signals on optical beams, etc.

Several high frequency acousto-optic modulators have been reported using surface acoustic wave (SAW) and bulk acoustic wave (BAW) transducers. However, integration of fluidics with ultra-high frequency (UHF) acoustic transducers for modulation has remained a challenge due to the following reasons. As the attenuation coefficient of liquids increase with frequency, the extent of observable AOM in them is limited to a few μm, thus requiring microfluidic technology. Secondly, the liquids must be placed on the same side of the transducer, as a result, considerable area is required to isolate the electrical interconnects of the transducers from the fluidic sample. Lastly, the sensitivity of their resonance to mass loading requires feedback control for optimal operation.

Described below is a CMOS compatible GHz focused bulk acoustic wave transducer that is used to modulate the refractive index of water, and water-based solutions contained in a microfluidic reservoir. The planar transducer with electrical input on the opposite side of the focused beam output enables easier integration with fluidics for AOM. A UHF laser vibrometer, which is sensitive to refractive index variations along its path is used to determine the change in refractive index of water.

Material and Methods II

A planar GHz bulk acoustic wave transducer was used here. The electrodes on the transmit side of the silicon substrate were patterned in Fresnel zone plate (FZP) configuration in order to focus the emanating acoustic field through the silicon substrate onto the opposing receive side. The receive electrode was patterned to form a circular transducer of 2 μm radius. The cross-sectional sketch of the simplified GHz transducer stack with images of the fabricated planar FZP shaped AlN transducer on the transmit side and a small circular AlN transducer on the receive side are shown in FIG. 1B.

The resonant frequency of the transducer stack was 1.08 GHz. The Fresnel lenses can be designed for other frequencies between about 100 MHz to 10 GHz. As the frequency decreases, the wavelength of the ultrasonic waves increases, making the ring radii and the lens size too large to focus through the silicon wafer, and a low density of actuators is possible. At the very high frequency, the wavelength is small, enabling increased number of transducers for a given area. However, at the higher frequencies, the absorption in the silicon and the fluids is higher, reducing the volume of the microfluidic channel that can be effectively illuminated by the ultrasonic fields and the associated gradients. The Fresnel zones were designed such that the focal length at the resonant frequency corresponded to the thickness of the silicon substrate. Five element Fresnel rings were used, and the radius of the outermost ring was 165 μm. The 2D PZFlex simulation result for normalized acoustic pressure showed focusing to be at 725 μm in silicon (see FIG. 12).

A square PDMS microfluidic reservoir of height 27.3 μm and 5 mm wide with a fluidic inlet port was fabricated using soft lithography process. The molds for the PDMS channel can be made using SU8 2025 photoresist. The surfaces of the cured PDMS channel and the AlN/Si transducer stack can be modified using a room temperature plasma cleaner for 30 s before bonding. Further, the thickness of PDMS was at least 2 mm.

Figure 12:
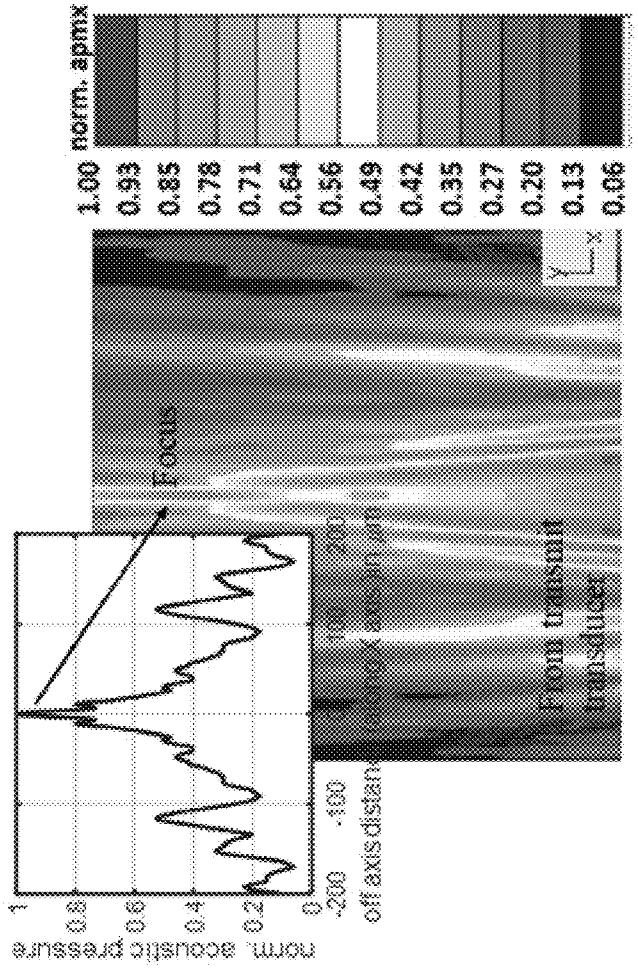
FIG. 12 depicts an example of a 2D simulation result showing focusing of sonic waves emanating from a Fresnel type transducer in silicon substrate.

FIG. 12 depicts a 2D PZFlex simulation result showing focusing of sonic waves emanating from a Fresnel type transducer in silicon substrate. The inset is the normalized off-axis pressure profile at the focal point.

Figure 13:
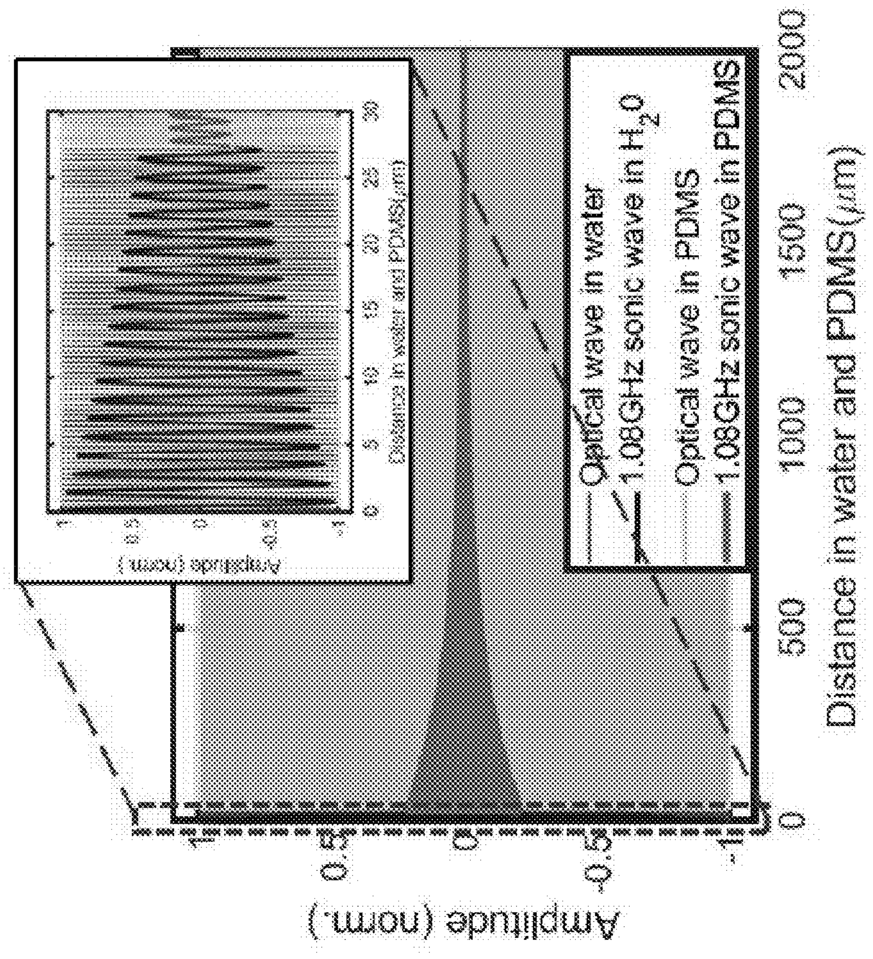
FIG. 13 shows an example of a 1D optical and acoustic wave model in water and PDMS.

FIG. 13 depicts an example of a 1D wave model of a wave propagating from 27.3 μm thick water to 2 mm thick PDMS. Inset shows that the acoustic wave attenuation in water and PDMS. Also, negligible attenuation of the optical wave in both the media can be observed.

At high frequencies, the optical and acoustic wavelengths are comparable, leading to higher scattering. Further, as the absorption in water as well as in PDMS is high, the acoustic waves get attenuated restricting the creation of standing waves in the channel. FIG. 13 shows the 1D optical and acoustic wave model in water and PDMS.

1D PZ-Flex model of the AlN transducer stack was also simulated, initially with air backing on both the sides, and later with water of thickness corresponding to that of the microfluidic reservoir on one side of the stack. An absorbing boundary condition was used in the simulation to mimic the effect of thick PDMS channel. The simulation results showed that the shift in resonance due to fluidic loading was ~3 MHz, indicating a negligible (<0.3%) frequency shift.

Experiments and Results II

A continuous wave RF signal from the vector signal generator was applied to the Fresnel lens type transducer. The resonant frequency of the transducer was determined. Maximum surface displacement was observed when the frequency of the RF input signal was 1.08 GHz. The region around the small circular receive transducer was scanned to determine the surface displacement profile. The surface displacement profile around the receive transducer is shown in FIG. 5A for $5V_p$, 1.08 GHz RF input signal. The peak displacement ~250 pm was achieved with <10 μm FWHM confirming focusing of GHz ultrasonic waves.

A PDMS microchannel was then bonded to the transducer such that it completely enclosed the receive transducer. The bonded device was then placed under a Polytec UHF-120 vibrometer as shown in FIG. 14 for measurement of optical path length shifts in the water.

Figure 14:
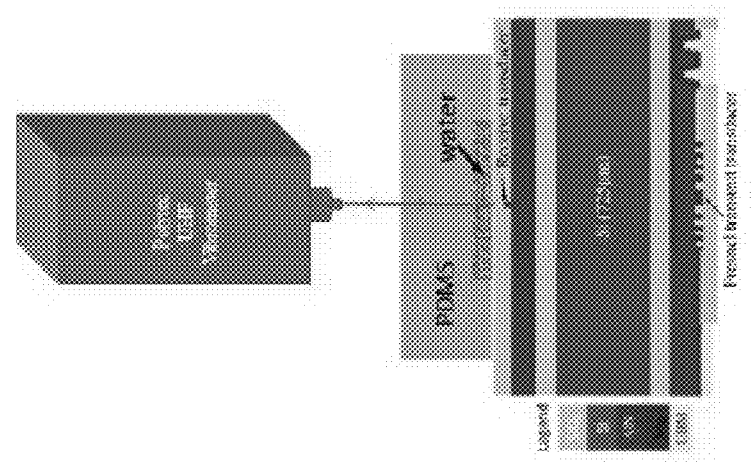
FIG. 14 depicts an example of an acoustooptic modulator (AOM) experimental setup.

FIG. 14 depicts an example of an AOM experimental setup. The laser light from Polytec vibrometer was focused at the receive transducer to measure the surface displacement with and without water.

Figure 15:
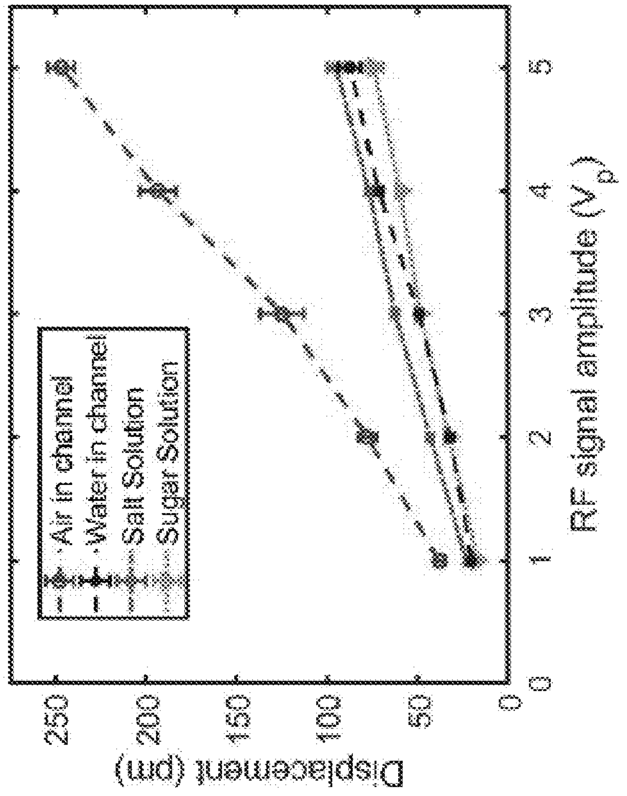
FIG. 15 depicts examples of peak particle displacement values recorded at the location of the receive transducer using UHF vibrometer.

Green laser light (λ=532 nm) from the Polytec UHF-120 vibrometer was focused at the receive transducer. Peak displacement was measured for different RF input voltages with air in the PDMS cavity. Later, the cavity was filled with DI water. The surface displacement at the same location was measured for different RF input voltages. The error bar plot of the measured displacements is shown in FIG. 15. Water was then replaced with water-based solutions such as salt-water and sugar syrup, and the displacement at the receiver was measured. This was done to verify the correctness of the range of displacement readings displayed by the vibrometer software, also to see slight distinction in the displacement values for solutions of different acousto-optic properties.

Laser doppler vibrometer (LDV), generally used to measure vibrations is based on Mach-Zehnder interferometer. The system is sensitive to changes in the refractive index ($\Delta n$) along the path of the laser beam. The optical path length (OPL) measured by the LDV is given by $$OPL=\int_{\delta_0 cos(\omega t)}^{z_H} n(z,t)dz \quad \text{EQ. (5)}$$

where, $\delta_0$ cos ($\omega$t) is the displacement observed at the receiver without water changing at acoustic frequency $$\left(f = \frac{\omega}{2\pi}\right),$$

and $z_H$ is the height of the microfluidic channel. Suppose the particle displacement in water decays as $\delta(z,t)=\delta_0 e^{-\alpha z}$ Cos ($k_{ac}z-\omega t$), with $\alpha$ being the attenuation coefficient, and $k_{ac}$ the propagation constant of the acoustic wave. The first order strain in water is then, $$\epsilon(z,t)=\delta_0 e^{-\alpha z}\cos(\omega t)[\alpha\cos(k_{ac}z)+k_{ac}\sin(k_{ac}z)] \quad \text{EQ. (6)}$$

The peak change in refractive index, $\Delta n_p \propto \epsilon_{max}$, is given by $\Delta n_p \approx -0.5\, n^3 p\, \epsilon_{max}$, where p is the photoelastic constant. FIG. 15 depicts examples of peak particle displacement values recorded at the location of the receive transducer using UHF vibrometer.

The modulating refractive index in the medium is then, $$n(z,t)=n_0-pn_0^3\delta_0 e^{-\alpha z}\cos(\omega t)[\alpha\cos(k_{ac}z)+k_{ac}\sin(k_{ac}z)] \quad \text{EQ. (7)}$$

Substituting (7) in (4) gives, $$OPL=\int_{\delta_0 cos(\omega t)}^{z_H}(n_0-pn_0^3\delta_0 e^{-\alpha z}\cos(\omega t)[\alpha\cos(k_{ac}z)+k_{ac}\sin(k_{ac}z)] \quad \text{EQ. (8)}$$

Upon solving and simplifying the definite integral, we get $$OPL=n_0[z_H-\delta_0\cos(\omega t)]+pn_0^3\delta_0\cos(\omega t)[e^{-\alpha\delta_0 cos(\omega t)}\cos(\delta_0 k_{ac}\cos(\omega t)-e^{-\alpha z_H}\cos(k_{ac}z_H)] \text{EQ. (9)}$$

An alternate equation, less rigorous mathematically, may be derived to determine the approximate change in refractive index assuming negligible effects encountered by the acoustic wave propagating from solid to the liquid medium. As the particle velocity measured by the LDV($v_{LDV}$) is the time rate of change of OPL, $$v_{LDV} = \frac{du_{LDV}}{dt} = \frac{d(OPL)}{dt} \approx \frac{d}{dt}(n*z) \quad \text{EQ. (10)}$$

where, z is the height of the cavity containing the liquid undergoing modulation. If $\Delta z$ and $\Delta n$ are the changes in cavity height and the liquid's refractive index, such that $\Delta z \ll z_0$ and $\Delta n \ll n_0$ respectively, then z and n may be written as EQ. (11). The terms with a subscript '0' indicate initial values $$z=z_0=\Delta z e^{-j\omega t}, n=n_0-\Delta n e^{-j\omega t} \quad \text{EQ. (11)}$$

Since the excitation signal is harmonic, upon substituting equations (11) in (10), we get $j\omega u_{LDV}e^{j\omega t}=n\cdot(-\Delta z\cdot j\cdot\omega\cdot e^{j\omega t})+z(-\Delta n\cdot j\cdot\omega\cdot e^{j\omega t})$. The change in refractive index is $$\Delta n = \frac{nu_{actual}-u_{LDV}}{z} \approx \frac{n_0 u_{actual}-u_{LDV}}{z_0} \quad \text{EQ. (12)}$$

Figure 16:
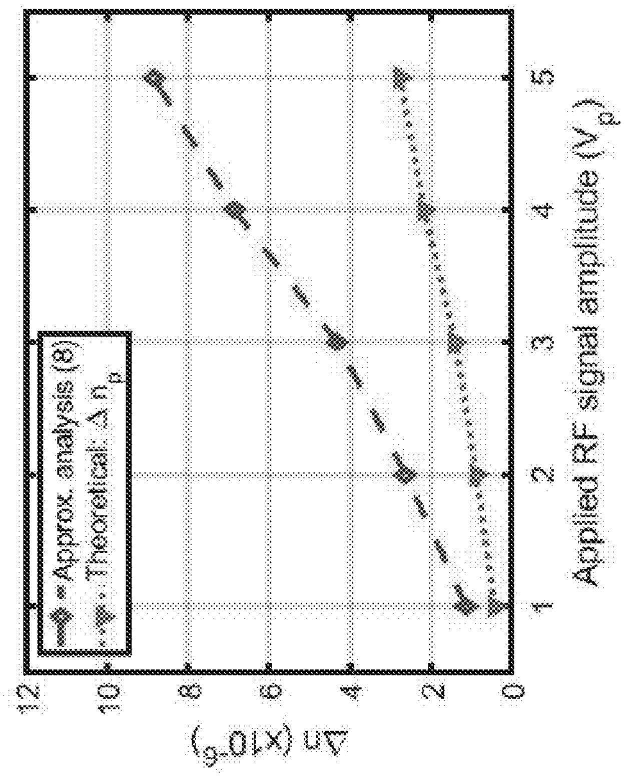
FIG. 16 depicts an example of a change in refractive index of water versus applied RF drive voltage.

The change in refractive index for water was also determined using equation (12) from the measured displacement values (FIG. 15) and by calculating $n_0$ of water for $\lambda_0$=532 nm at 20° C. The values were compared to the theoretical value of $\Delta n_p$, with p=0.31 for water. FIG. 16 shows the value of $\Delta n$ for different RF drive voltages. The relationship between $\Delta n$ and V is linear and the $\Delta n_p$ is of the $0(10^{-6})$.

The non-linearities in the water due to acoustofluidic effects, and the temperature changes due to the incident optical wave and focused ultrasonic wave at the receive transducer also affect the refractive index. The changes in temperature due to green laser of 5 mW power and due to ultrasound were calculated to be ~0.5 mK (for 30 minute exposure) and 5 mK (5 $V_p$ RF input) respectively. Corresponding $\Delta n$ is of the order of $10^{-8}$ and $10^{-7}$ respectively, indicating that the modulation is mostly due to photoelastic effect.

FIG. 16 depicts an example of a change in refractive index of water versus applied RF drive voltage.

The change in the phase ($\Delta\phi$) due to the refractive index modulation was calculated from EQ. (9) and compared with that from EQ. (12). FIG. 17 shows the phase difference modulating at 1.08 GHz acoustic frequency determined using EQ. (9) and (13). From the OPL approach EQ. (13), the peak value of $\Delta\phi$ was determined to be 6 mrad when the input to the Fresnel transducer was 5 Vp RF signal.

$$\Delta\phi = \frac{2\pi}{\lambda_0}(n_0 * 2z_H) - \frac{2\pi}{\lambda_0}(n*2*OPL) \quad \text{EQ. (13)}$$

A GHz frequency strain wave in the fluid can lead to change in the index of refraction in the liquid owing to photoelastic effect. The focused beam of very high intensity, 1.7 kW/cm$^2$, emanating from the Fresnel type transducer is used to modulate the optical parameters of materials, such as the optical index of refraction. The decaying ultrasonic waves in the liquid modulates its refractive index and provides a net phase shift to the optical beam incident and reflected off the top metal electrode of the receive transducer. The calculated change in the refractive index of water is on the $0(10^{-6})$. The phase of the optical beam is modulated at acoustic frequency of 1.08 GHz, and a peak phase difference of 6 mrad was achieved when the Fresnel type transmit transducer was driven by a 5 $V_p$ RF signal. Further, the total modulator area of such a system is 0.086 mm$^2$. With a proven approach for monolithic integration of AlN transducers with CMOS circuits, this device is a pathway towards inexpensive CMOS integrated acousto-optic modulator arrays with a capability of digital and analog feedback control of phase and array homogeneity.

Figure 17B:
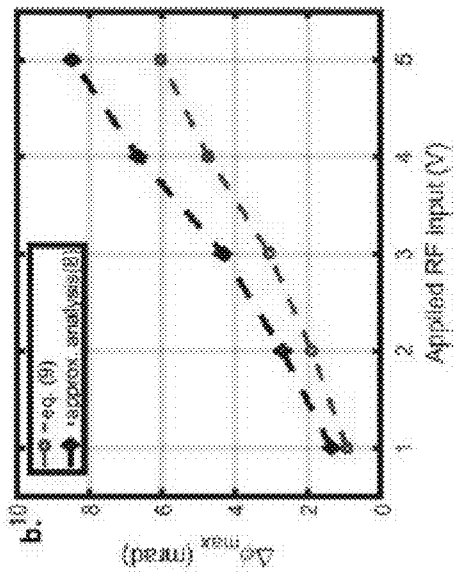
Figure 17A:
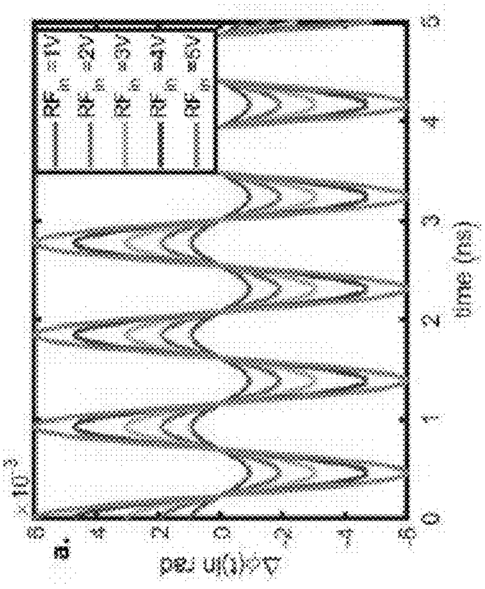
FIG. 17A depicts an example of a phase difference of the light wave modulating at GHz frequency.

FIG. 17A depicts an example of a phase difference of the light wave modulating at GHz frequency. FIG. 17B depicts a comparison of peak phase difference as a function of applied RF voltage obtained from the approximate analysis and from.

Localized Microfluidic Mixer Using Fresnel Ghz Ultrasonic Transducer

Efficient and rapid mixing of laminar fluid flows is critical for several microfluidic applications such as drug screening, medical diagnosis, chemical synthesis, genetic analysis, protein folding studies, etc. Traditional macroscopic fluidic mixing strategies employing long channels, mechanical or magnetic stirring elements become impractical for microscale mixing. Furthermore, as microfluidic flow lies in the laminar regime, mixing is dominated by diffusion, which is slow and prevents mixing in channel lengths compatible with microfluidic chip dimensions.

To improve the mixing time and the homogeneity of mixing (i.e., mixing efficiency), various approaches have been employed. These approaches can be classified into passive and active mixing based on the absence or presence of an external energy source. While passive mixing is usually implemented by channel geometries that fold flow lines, the external energy in active mixers is used to trigger localized motion of the fluids. Active mixers generally outperform the passive counterparts with respect to mixing time, efficiency, and required channel length.

Active microfluidic mixers employing external electrical, thermal, magnetic or acoustic energy sources have been reported. However, acoustic and ultrasonic based mixers are advantageous as they perform contactless fluidic mixing without depending on the electrical properties of the fluid such as the conductivity of the fluid or the dielectric properties of the fluid.

Acoustic mixers perturb the streamlined flow in the microfluidic channel by employing bulk acoustic wave (BAW), surface acoustic wave (SAW) or membrane transducers. Many acoustic mixers use acoustic bubbles to efficiently generate vortices to rapidly mix fluids. However, owing to their complicated constructions and instability of the bubble generation, direct generation of streaming without the assistance of bubbles is preferred.

For efficient and rapid mixing, strong acoustic streaming forces are required. The body force, $F_B$, that generates streaming vortices at the edges of the acoustic fields in fluids is given by $F_B=\rho\alpha v^2$. Here, the attenuation coefficient in the fluid $\alpha$, and the particle velocity v scale as $f^2$ and f respectively; f being the frequency of the acoustic wave. Thus, as $F_B \propto f^4$, much interest is being showed in developing ultra-high frequency SAW and BAW based microfluidic mixers. However, most of these actuators reported thus far require >10V drive voltage and are fabricated using non-CMOS compatible materials such as zinc oxide, lithium niobate, lithium tantalate or lead zirconate titanate (PZT). Furthermore, in most of these devices, the fluid is placed on the same side of these transducers. This then forces considerable chip area dedicated to isolate electrical interconnects from the fluidic sample. These factors can result in increased device area, expense of fabrication, and electronics complexity in the generation and amplification of high voltages at ultra-high frequencies.

Described above is an acoustofluidic micro-mixer that uses GHz focused ultrasonic beam to create localized streaming vortices in the microchannel. The device is fabricated without any thin-film release steps, using CMOS compatible materials like aluminum nitride (AlN) solidly mounted to silicon substrate. Further, the placement of the transducers on the opposite side of fluidics enable easier integration of distributed CMOS electronics with AlN transducers on one side, and the fluidic system on the opposite side. The ability to beam form from GHz sonics is further enabled by the thickness of the silicon wafer as being many wavelengths thick, enabling Fraunhofer and Fresnel diffraction analysis to be used.

Figure 18B:
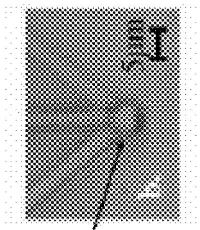
FIG. 18B depicts an example image of a circular transducer on the receive side after fabrication.
Figure 18C:
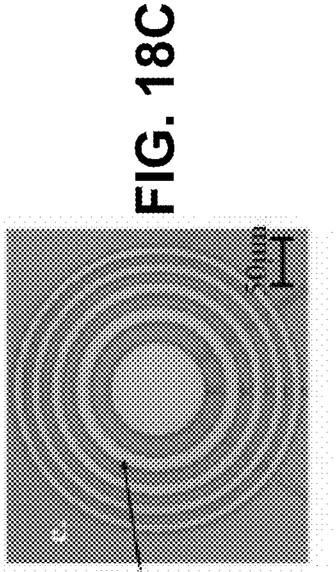
FIG. 18C depicts an example an image of a Fresnel lens transmit transducer after fabrication.
Figure 18A:
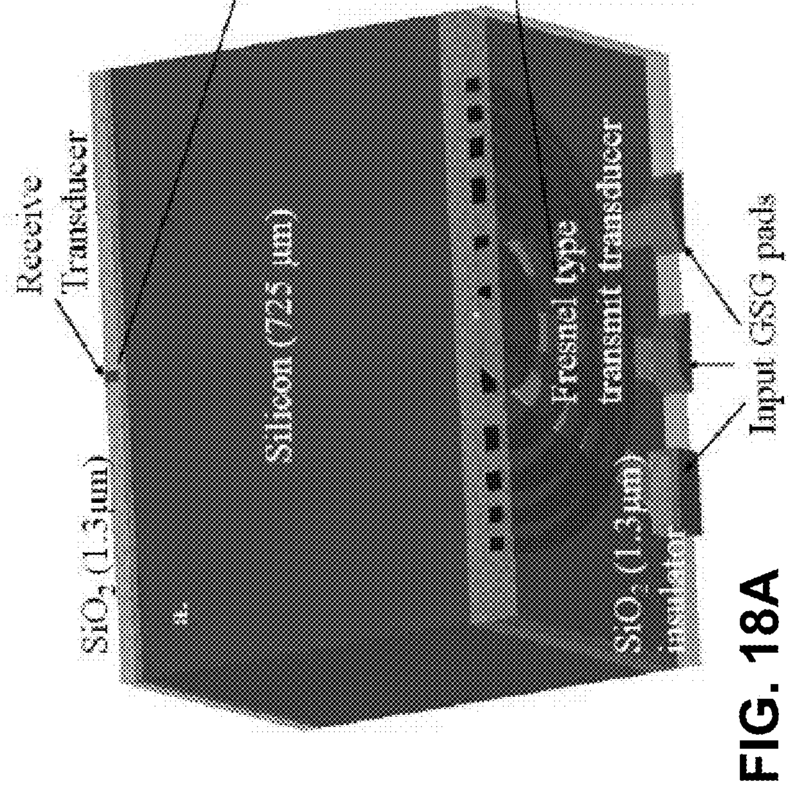
FIG. 18A depicts an example of a cross-sectional schematic of the structure of the AlN—Si stack.

FIG. 18A depicts an example of a cross sectional schematic of the structure of the AlN—Si stack. FIG. 18B depicts an example image of the circular transducer on the receive side after fabrication. FIG. 18C depicts an example an image of the Fresnel lens transmit transducer after fabrication.

Material and Methods III

Planar AlN based transducer stack for GHz ultrasonics, similar to the one previously reported by our group, was used here. The AlN transducers were fabricated at the Institute of Microelectronics (IME) in Singapore under the IARPA—Trusted Integrated Chips (TIC) program. Resonant frequency of the transducer was 1.06 GHz. The transducer consisted of 200 nm molybdenum as electrode layers, 2 μm thin film piezoelectric AlN, and 1.3 μm thick insulating silicon dioxide layer, on a 725 μm thick silicon wafer.

The electrodes on one (transmit) side of the silicon substrate were patterned in Fresnel zone plate (FZP) configuration in order to focus the emanating acoustic field through the silicon substrate onto the opposing receive side. The receive electrodes were patterned to form a circular transducer of 2 μm radius. The cross-sectional sketch of the simplified GHz transducer stack with planar FZP shaped AlN transducer on the transmit side and a small circular AlN transducer on the receive side is shown in FIG. 18. AlN in the regions without transduction are not shown here for simplicity.

In a Fresnel lens design, the distance from each annular zone to the point of focus is an integral multiple of the wavelength. As a result, the acoustic waves reach the focal point in phase, interfering constructively. If the wavelength of the wave in the medium is $\lambda_{Si}$, the focal length is F, then the radius of each annular zone is given by:

$$r_n = \sqrt{\frac{n\lambda_{Si}}{2}\left(F + \frac{n\lambda_{Si}}{8}\right)} \quad \text{EQ. (14)}$$

The longitudinal speed of sound in silicon being 8000 m/s, the AlN Fresnel lens radii were optimized to achieve a focal length of ~725 μm in silicon for 1.06 GHz using PZFlex simulation software. Five Fresnel rings were used, and the radius of the outermost ring was 165 μm. The 2D PZFlex simulation result for normalized acoustic pressure showed focusing to be at 725 μm in silicon (see FIG. 12).

FIG. 12 depicts an example of a 2D PZFlex simulation result showing the focal length of the FZP transducer to be 725 μm in silicon substrate. The inset is the normalized off-axis pressure profile at the focal point.

Figure 19A:
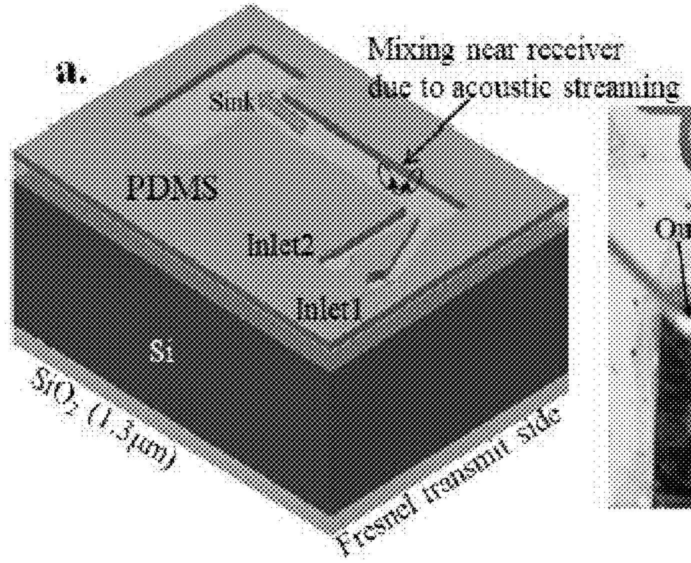
FIG. 19A depicts a sketch showing the location of mixing activity in a PDMS microfluidic channel on top of the AlN—Si transducer stack.
Figure 19B:
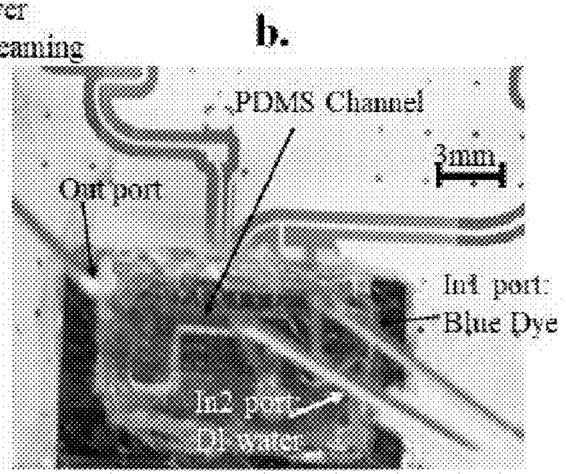
FIG. 19B depicts an example image of a GHz acoustofluidic micro-mixer after bonding.

FIG. 19A depicts a sketch showing the location of mixing activity in the PDMS microfluidic channel on top of the AlN—Si transducer stack. FIG. 19B depicts an example image of a GHz acoustofluidic micro-mixer after bonding.

A polydimethylsiloxane (PDMS) microfluidic channel with two inlet ports and an outlet port was fabricated using standard soft lithography process. The molds for the PDMS channel were made using 325 μm thick SU8 100 photoresist spun onto a clean silicon wafer. The photo resist was patterned using UV contact lithography to make a 700 μm wide channel. PDMS resulting by mixing Sylgard 184 silicone elastomer base and curing agent in the mass ratio 10:1 was poured onto the silicon wafer with SU8 master. The cured PDMS stamp was then peeled off from the silicon wafer and cut to make a microfluidic channel. The surfaces of the PDMS channel and the AlN—Si transducer stack were modified using a room temperature plasma cleaner for 30 s before bonding. The image of the PDMS channel bonded onto the AlN—Si transducer substrate is shown in FIG. 19A.

Experiments and Results III

Figure 20A:
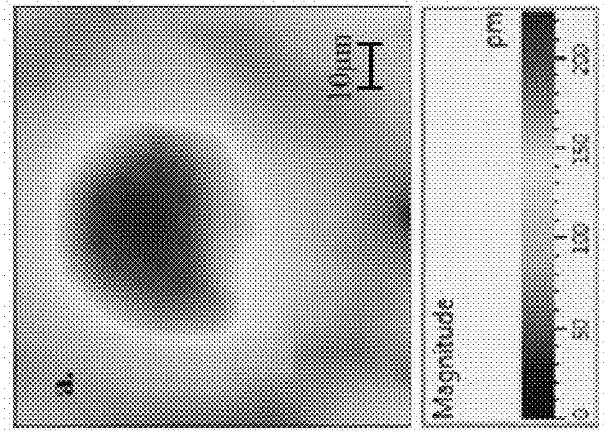
FIG. 20A depicts an example of a scanned surface displacement profile at the region near the receiver for 5V drive voltage.

The Fresnel type transducer was first characterized using a Polytec UHF-120 vibrometer, before bonding the microfluidic channel. A continuous wave signal from a vector signal generator was applied to the Fresnel lens type transducer. With the drive voltage amplitude at 5V, the frequency was varied from 1.01 GHz to 1.1 GHz to determine the resonant frequency. The peak displacement was observed at 1.06 GHz. The surface displacement near the small circular receive transducer was then scanned and a narrow beam width ~10 μm was observed due to focusing of GHz ultrasonic waves (FIG. 20A). Both these experiments confirmed focusing of the acoustic wave emanating from the surface of the planar Fresnel lens transmit transducer and closely match the results from PZFlex simulations.

Figure 20B:
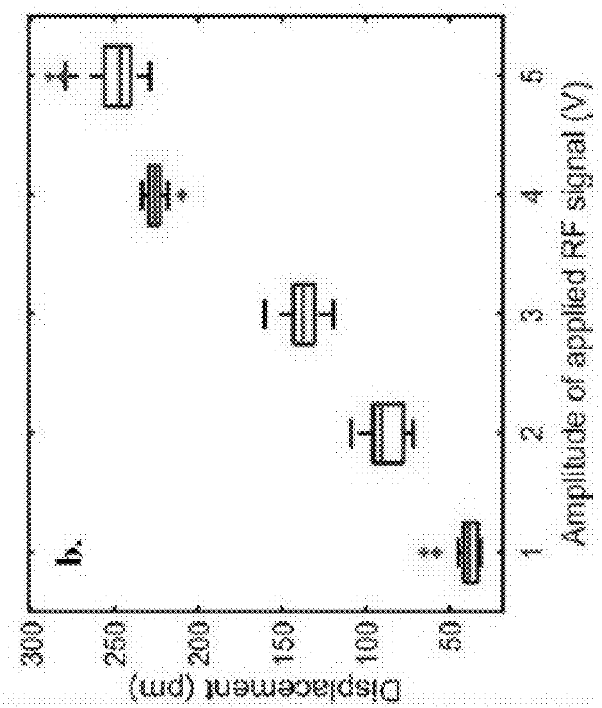
FIG. 20B depicts an example of a box plot of surface displacement at the point of focus with different applied voltages.

FIG. 20A depicts an example of a scanned surface displacement profile at the region near the receiver for 5V drive voltage. FIG. 20B depicts an example of a box plot of surface displacement at the point of focus with different applied voltages (twenty data points are plotted for each voltage).

The surface displacement (u) at the center of the receive transducer was then recorded as a function of the RF drive voltage. The expected linear behavior of displacement with applied voltage was observed (FIG. 40.*b*). From the displacement data, the average acoustic intensity was determined using $$I_{avg}=\frac{1}{2}pv \qquad \text{EQ. (15)}$$

where, p=ρcv is the acoustic pressure, and v=uω is the particle velocity of a harmonic system. For a drive voltage of 5V, the average intensity was calculated to be 1.7 $kW/cm^2$ on the silicon dioxide surface located on the receive side. Thus, a very high intensity ultrasonic beam was realized from the GHz Fresnel type transducer. After the surface displacement characterization, the wire bond to the printed circuit board (PCB) were removed and the transducer was cleaned to facilitate bonding of the PDMS microchannel onto the AlN/Si transducer.

The transmit Fresnel transducer located on the bottom side of the bonded microfluidic device was again wire bonded to the PCB. The transducer was powered using an Agilent N9310A signal generator with the input frequency fixed at 1.06 GHz, corresponding to the resonant frequency of the transducer. Blue colored food dye diluted with water, and water with 2 μm polystyrene microbeads were pumped into the microfluidic channel. Polystyrene microbeads were added to enhance the color contrast while capturing the mixing activity. The flow rates were controlled using Cor-Solutions microfluidic pumps.

Firstly, the RF power from the signal generator was varied from 2 dBm to 20 dBm, keeping the flow rates of both the fluids constant at 20 μL/min. Then, the RF power was fixed at 20 dBm and the flow rates were varied from 5 μL/min to 20 μL/min. The videos of the mixing of water containing polystyrene microbeads with diluted blue dye were recorded using a digital handheld camera in both the cases. Five images at different times were captured from the recorded videos, and the mixing efficiency was calculated using MATLAB. If $I_i$ and $\bar{I}$ are the intensity values of the $i^{th}$ pixel and the average value of the N pixels in the mixed region of interest (ROI) respectively, and $I_i'$ and $\bar{I}'$ are those at the unmixed region, mixing efficiency is given by:

$$\text{Mixing Efficiency}=\left(1-\frac{\sqrt{\frac{1}{N}\sum_{i=1}^{N}(I_i-\bar{I})^2}}{\sqrt{\frac{1}{N}\sum_{i=1}^{N}(I_i'-\bar{I}')^2}}\right)\times 100 \qquad \text{EQ. (16)}$$

Figure 22A:
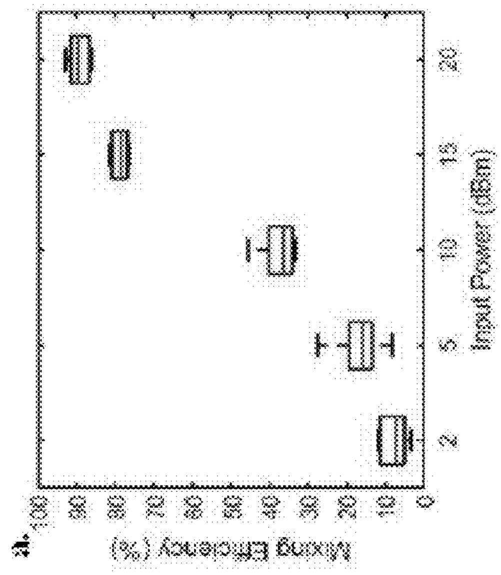
FIG. 22A shows an example of a box plot of mixing efficiency for different input power levels with a flow rate of 20 μL/min.

The box plots of the mixing efficiency for both the experiments are shown in FIG. 22A/B. Intensity values of fifteen pixels from each of the five images were considered near the mixed and unmixed regions for calculations. It can be observed that 90% mixing efficiency was achieved with 20 dBm input power.

The high mixing efficiency means that the mixing is uniform in the region of interest, near the receive transducer. From FIG. 21A-B, it can be observed that the mixing activity is highly localized to <200 μm region along the width of the channel.

The higher mixing efficiency and localized mixing are due to the GHz frequency focused ultrasonic beam. At high frequencies, attenuation in fluids play a key role as the attenuation coefficient, $\alpha(f)=\alpha_0 f^2$, is a strong function of frequency. In pure water, the characteristic attenuation length, $\alpha^{-1}$, is about 17 μm at 1.06 GHz at 20° C. From the experimental surface displacement data, the acoustic intensity of water, $I=I_0e^{-\alpha(f)x}$, is calculated to be 630 $W/cm^2$ at the characteristic length. As a result, the body force, $$F_B=\frac{2I\alpha}{c}$$

is enhanced resulting in localized streaming vortices. Previously, we measured the streaming velocities to be >2.6 mm/s for 5V amplitude input.

The Reynolds number (Re), that characterizes the importance of inertial and viscous forces is calculated to be <1 for the microfluidic conditions used here, implying the dominance of viscous forces and laminar flow of fluids. The Reynolds number is calculated using (13), where ρ is the density of the fluid, U is the flow velocity and l is the characteristic length of the channel.

$$Re=\frac{\rho Ul}{\eta} \qquad \text{EQ. (17)}$$

Another important dimensionless number, Peclet number (Pe), that is used to characterize the importance of diffusion to convection in the mixer is calculated to be in the range of about 81-325. Pe is calculated from (14), where D is the diffusivity of the fluid ($D=2\times10^{-9}$ $m^2/s$). Table 1 lists the values of Re and Pe for different flow rates in the channel.

$$Pe=\frac{Ul}{D} \qquad \text{EQ. (18)}$$

TABLE I

Values of Fluidic Parameters
Channel dimensions: W = 700 μm, H = 325 μm

| Flow rate (μL/min) | Velocity (mm/s) | Re | Pe |
|---|---|---|---|
| 5 | 0.37 | 0.16 | 81 |
| 10 | 0.73 | 0.33 | 162.5 |
| 15 | 1.1 | 0.49 | 244 |
| 20 | 1.46 | 0.65 | 325 |

Described above is a highly localized GHz ultrasonic microfluidic mixer has been presented. The acoustofluidic mixing device consists of a PDMS microfluidic channel bonded to the backside of a silicon chip consisting of a planar AlN—Si transducer stack. The transducer stack consists of an AlN based Fresnel transducer that is used to focus GHz sonic waves through the bulk silicon substrate. The FZP transducer is designed such that the focal length is equal to the thickness of the substrate. Further decrease in input voltage needed to achieve fluidic mixing can be realized by proper matching to the transducer RF impedance.

Figures 21A, 21B:
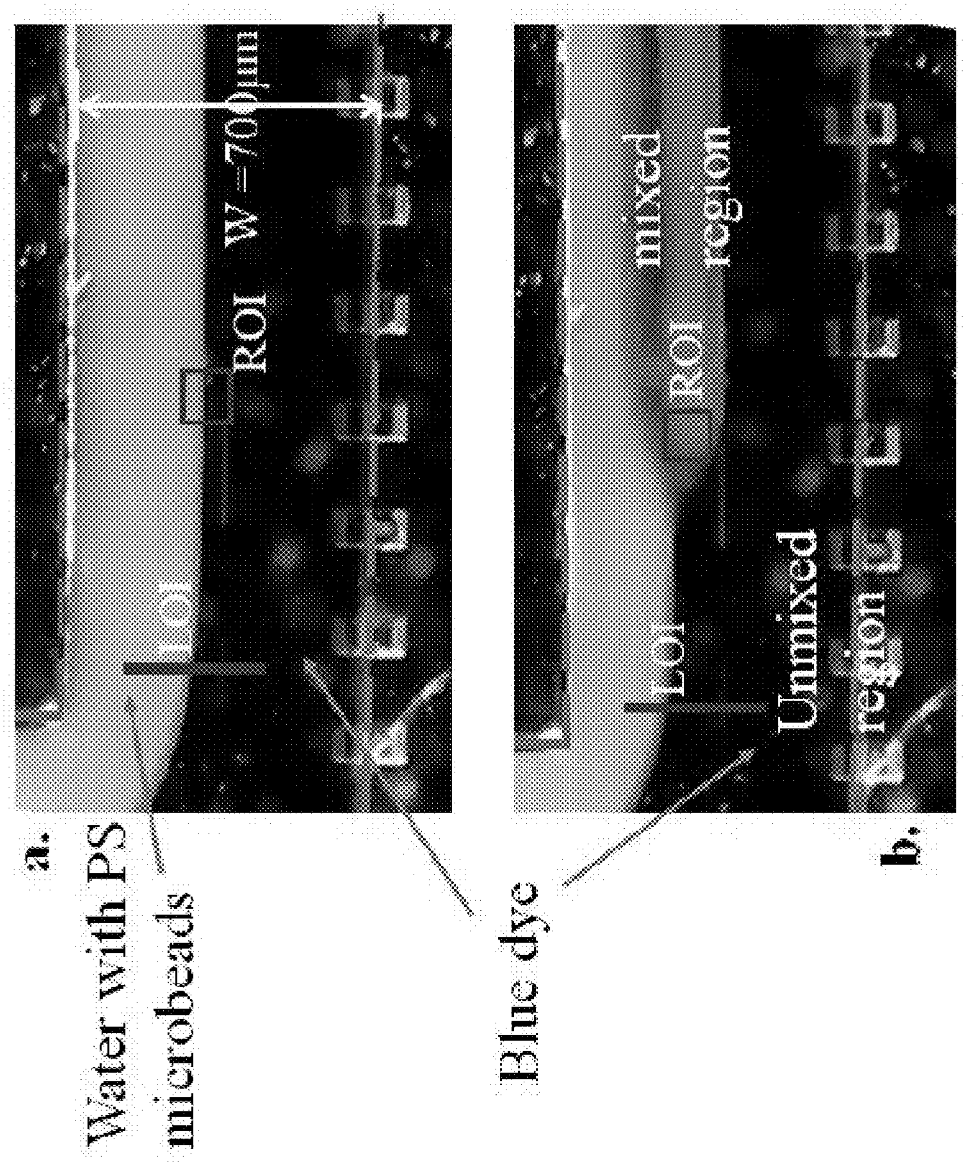
FIG. 21A shows an example of an image capture showing negligible mixing activity near the receive transducer when RF input power is 2 dBm for an example device.
FIG. 21B shows an example of an image capture showing localized mixing when RF input power is 20 dBm for an example device.

FIG. 21A shows an example of an image capture showing negligible mixing activity near the receive transducer when RF input power is 2 dBm FIG. 21B shows an example of an image capture showing localized mixing when RF input power is 20 dBm (LOI: Line of interest; ROI: region of interest for mixing efficiency calculation).

Figure 22B:
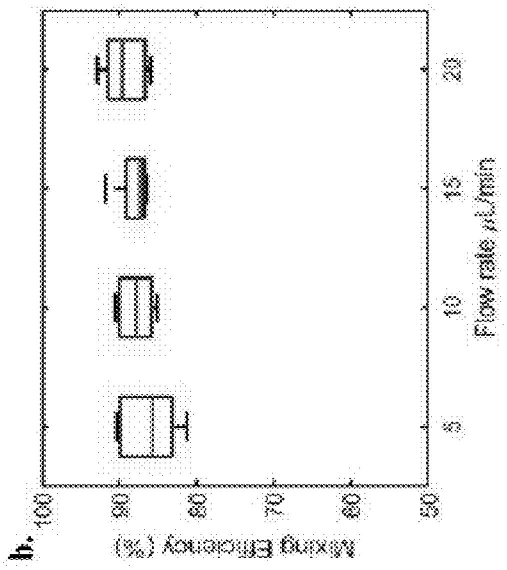
FIG. 22B shows an example of a box plot showing constant mixing efficiency for different flow rates with an input power of 20 dBm.

FIG. 22A shows an example of a box plot of mixing efficiency for different input power levels when flow rate was 20 μL/min. FIG. 22B shows an example of a box plot showing constant mixing efficiency for different flow rates when input power is 20 dBm. (Frequency of operation is 1.06 GHz; data from five images were used in the calculation.)

Owing to the high dissipation of GHz sonic waves in fluids, a strong streaming force is generated. This perturbation induces mixing of the two fluids—water with polystyrene microbeads and blue dye near the vicinity of the receive transducer. The ability to change the frequency of ultrasound and the amplitude can also be used to spread the spatial extent of the acoustic force in fluids.

Since the RF voltages required for actuation and the fabrication process are both CMOS compatible, and the fluidic systems are decoupled from the electrical interconnects, an integrated CMOS-acoustofluidic device can be realized. Such a device would not only reduce the size and cost of the test setting drastically, but also can enable digital control and automation of bio-chemical analytes in a closed lab-on-chip environment.

CMOS Compatible GHz Ultrasonic Fresnel Microfluidic Actuator

Micro-particle manipulation in liquid is useful in many chemical, biomedical, and biological applications. Among the contactless manipulation mechanisms, optical and acoustic techniques are the most common. The laser based optical technique can produce a few pico-Newtons of trapping forces but cannot control larger biological objects and operate in a medium of high optical opacity. On the other hand, acoustic devices can be more easily integrated with the microfluidic channel and have been shown to handle biological particles better because of longer wavelengths and higher radiation forces.

An acoustic wave propagating through a medium carries energy and momentum. Wave energy is dissipated into the liquid due to absorption and diffraction, and leads to momentum transfer to the liquid. When the wave encounters an object, scattering and net radiation forces can move the object. These forces can result in particle trapping, streaming, and atomization. As the acoustic radiation and streaming forces increase inversely with the acoustic wavelength in the medium, recent works have increasingly utilized higher frequencies for microparticle actuation. The gradient force, resulting from the radiation force can further be enhanced by having a larger intensity difference between the center of the beam and the peripheral region.

Acoustic beam-based manipulators such as acoustic tweezers that use high frequency focused ultrasonic beams have recently been explored. Most of the high frequency ultrasonic beam manipulators reported so far use surface acoustic wave (SAW) transducers on non-CMOS compatible substrates such as lithium niobate, lithium tantalate or lead zirconate titanate (PZT). Further, their actuation requires >10V drive voltage.

Micro-particle actuators based on bulk acoustic wave (BAW) have also been reported for driving circulatory motion in microfluidic chambers and micro droplet ejection. These millimeter scale devices have used PZT transducers, operate below 200 MHz frequencies, and typically require a drive voltage of a few 10 s-100 s of volts.

Despite the advantages of using high frequency focused ultrasonic beams for manipulation of fluid-laden particles, several challenges in the implementation prevents easy adoption. The expense of fabrication, and generation and amplification of high voltages at these frequencies are two reasons often mentioned. Another technological impediment is that considerable chip area is required to isolate the electrical interconnects of the transducers from the fluidic sample; as the fluid is placed on the same surface as the transducer.

Described above is a microscale GHz focused-beam bulk acoustic wave microparticle manipulator which decouples the fluidic side from the actuator side. The device is fabricated without any thin-film release steps, using CMOS compatible materials such as aluminum nitride (AlN) solidly mounted to silicon substrate. Microfluidic streaming action was observed near the vicinity of the focus and the streaming velocity in water with 2 μm diameter polystyrene microspheres was measured to be about 2.6 mm/s for a 5V amplitude, 1.06 GHz frequency continuous wave (CW) input.

Fresnel Microfluidic Actuator

Planar AlN based transducer stack for GHz ultrasonics, similar to the one previously reported by our group, was used here. The AlN transducers were fabricated at the Institute of Microelectronics (IME) in Singapore under the IARPA—Trusted Integrated Chips (TIC) program. Resonant frequency of the transducer was 1.06 GHz. The transducer consisted of 200 nm molybdenum as electrode layers, 2 μm thin film piezoelectric AlN, and 1.3 μm thick insulating silicon dioxide layer, on a 725 μm thick silicon wafer.

The electrodes on one (transmit) side of the silicon substrate were patterned in Fresnel zone plate (FZP) configuration in order to focus the emanating acoustic field through the substrate onto the opposing receive side. The receive electrodes were patterned to form a circular transducer of 2 μm radius. FIG. 18A shows an example of a cross-sectional sketch of the simplified GHz transducer stack with planar FZP shaped AlN transducer on the transmit side and a small circular AlN transducer on the receive side. AlN in the regions without transduction are not shown here for simplicity.

In a Fresnel lens design, the distance from each annular zone to the point of focus is an integral multiple of the wavelength. As a result, the acoustic waves reach the focal point in phase, interfering constructively. If the wavelength of the wave in the medium is $\lambda_{Si}$, the focal length is F, then the radius of each annular zone is given by:

$$r_n = \sqrt{\frac{n\lambda_{Si}}{2}\left(F + \frac{n\lambda_{Si}}{8}\right)} \qquad \text{EQ. (19)}$$

The longitudinal speed of sound in silicon being $c_{Si}$=7963 m/s, the AlN Fresnel lens radii were optimized to achieve a focal length of ~725 μm in silicon for 1.06 GHz using PZFlex simulation software. Five Fresnel rings were used, and the radius of the outermost ring was 165 μm. The 2D PZFlex simulation result for normalized acoustic pressure in silicon showed a maximum pressure around 725 μm (see FIG. 12).

Acoustic Streaming in Fluids

Propagation of an acoustic wave results in acoustic radiation forces on particles and acoustic streaming of fluids. These are second order effects that are caused by nonlinearities in governing physics. When the particle size is very small compared to the acoustic wavelength of the incident wave, i.e., ka«1 where, k is the propagation constant in the fluid and 'a' is the radius of the particle, the acoustic force on the particle is determined by the spatial gradient of the force potential field U, with the particle movement from the region of high force potential to low force potential. The acoustic radiation force is given by:

$$F_R = -\nabla U \quad \text{EQ. (20)}$$

and the force potential field is $$U = \frac{4\pi}{3} a^3 \left[ f_1 \frac{1}{2} \kappa_0 \langle |p_l|^2 \rangle - f_2 \frac{3}{4} \rho_0 \langle |v_l|^2 \rangle \right] \quad \text{EQ. (21)}$$

$$f_1 = 1 - \frac{\kappa_p}{\kappa_l} \text{ and } f_2 = \frac{2\left(\frac{\rho_p}{\rho_l} - 1\right)}{\frac{2\rho_p}{\rho_l} + 1} \quad \text{EQ. (22)}$$

$$\kappa = \frac{1}{\rho c^2} \quad \text{EQ. (23)}$$

In the above equations, $f_{1,2}$ parameters represent the monopole and dipole scattering coefficients, $\langle |p_l|^2 \rangle$ is the mean squared pressure, $\langle |v_l|^2 \rangle$ is the mean squared particle velocity in the fluid, ρ is the density and κ is the compressibility. The subscripts l denote the fluid and p denote the particle in the fluid medium.

In the Rayleigh regime, where ka«1, scattering force due to the reflection of propagating waves from the particle is small and is often neglected. Whereas, in Mie scattering regime, where the particle size is comparable or larger than the acoustic wavelength, i.e., ka>1, scattering becomes important. The force acting on the particle is now:

$$-F = \langle \textstyle\int_S p_2 n dS \rangle + \langle \textstyle\int_S \rho_l (n \cdot v_l) v_l dS \rangle \quad \text{EQ. (24)}$$

The integration is over an arbitrary surface, S that encloses the particle, and $\vec{n}$ is the vector normal to the surface. The second order pressure $p_{2l}$ for an inviscid fluid can be obtained from first order terms $$p_{2l} = \tfrac{1}{2}\kappa_0 \langle |p_l|^2 \rangle - \tfrac{1}{2}\rho_0 \langle |v_l|^2 \rangle \quad \text{EQ. (25)}$$

As the force potential is proportional to the cube of the particle radius, i.e., $F \propto a^3$, larger particles are displaced further away from the center of the ultrasonic beam compared to smaller particles. Further, as the force gradient scales inversely with the acoustic wavelength, high frequency ultrasonic waves increase both radiation and streaming forces. It is observed that with increasing frequency, the radiation force increases much faster than the force due to streaming.

Figure 23:
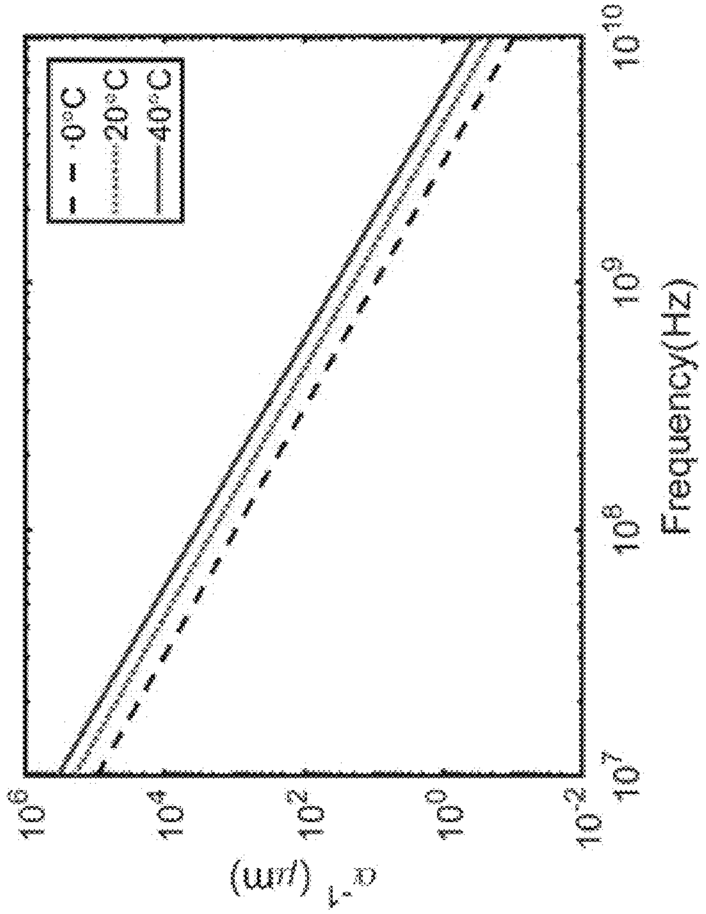
FIG. 23 shows example plots of a characteristic attenuation length in water.

At higher frequencies, attenuation in fluids also play a key role as the attenuation coefficient, $\alpha(f) = \alpha_0 f^2$, is a strong function of frequency. In pure water, the characteristic attenuation length, $\alpha^{-1}$ is below 100 μm for frequencies above 500 MHz at room temperature (FIG. 23). This indicates that the force fields can be highly localized at GHz frequencies. This can be used in applications such as particle and cell separation, concentration, droplet production, encapsulation, active sorting, controlled heating, nanotube alignment, viscosity measurement, and aerosol production.

In harmonic systems, the particle velocity in fluid, $v_l$, is given by $v = \omega u_l$, where ω is the angular frequency of the acoustic wave and $u_l$ is the displacement of the fluid due to the propagation of the ultrasonic wave. For fluids with low Mach $$M = \frac{v_l}{c} \ll 1,$$

where c is the acoustic velocity in the fluid, the second order streaming velocity is related to the first order velocity in fluid by $v_{2s} \propto v_l^2$. As the displacement $u_l$, is proportional to the applied voltage, it can be inferred that the second order streaming velocity increases as the square of the applied voltage, i.e., $v_{2s} \propto V_{in}^2$.

FIG. 23 shows example plots of a characteristic attenuation length in water.

Figure 24:
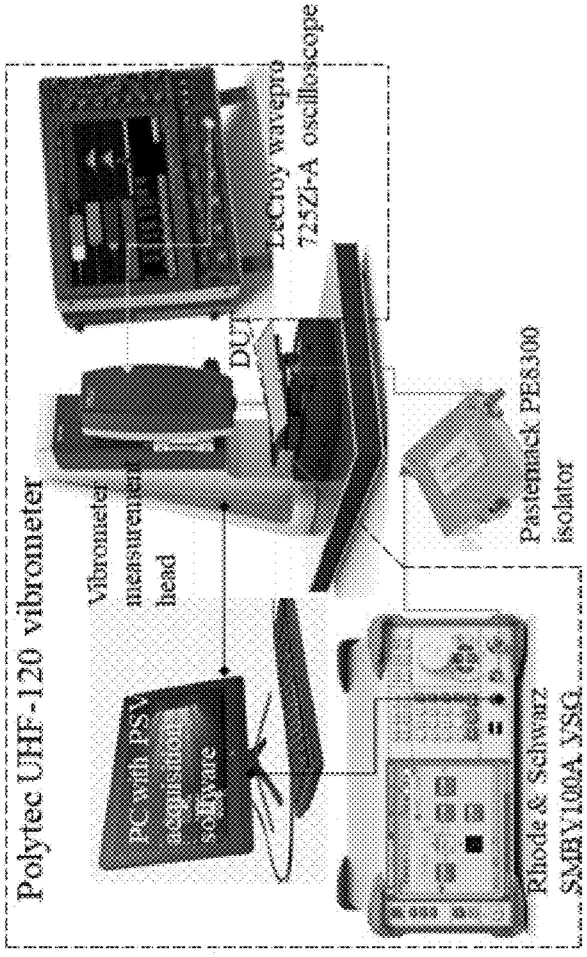
FIG. 24 shows an example experimental setup using a vibrometer.

FIG. 24 shows an example experimental setup using a vibrometer (e.g., Polytec UHF-120).

Experiments and Results IV

Figure 25B:
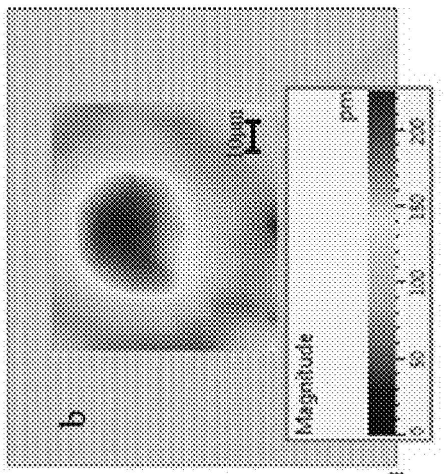
FIG. 25B shows an example of scan profile showing surface displacement on a receive side.
Figure 25A:
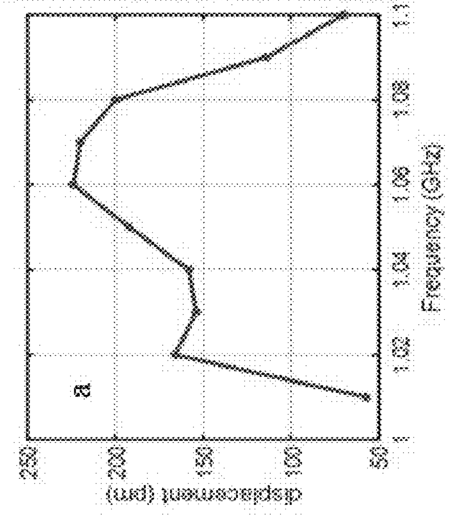
FIG. 25A shows an example of a plot of surface displacement at point of focus vs. input frequency.

The GHz FZP actuator displacement profile was characterized using a Polytec UHF-120 vibrometer (FIG. 24). Continuous wave (CW) signal from the vector signal generator (VSG) was applied to the Fresnel lens type transducer. Keeping the amplitude at 5V, frequency of the VSG was varied from 1.01 GHz to 1.1 GHz to determine the resonant frequency of the device. FIG. 25A shows an example plot of surface displacement on the receive side of the device under test (DUT) for various frequencies. Peak displacement profile was observed at 1.06 GHz, which closely matches with the PZFlex simulation. FIG. 25B shows the surface displacement profile of the DUT with peak displacement occurring at the location of the circular receive transducer. These two results confirm focusing of the acoustic wave emanating from the planar Fresnel lens transmit transducer.

Figure 26:
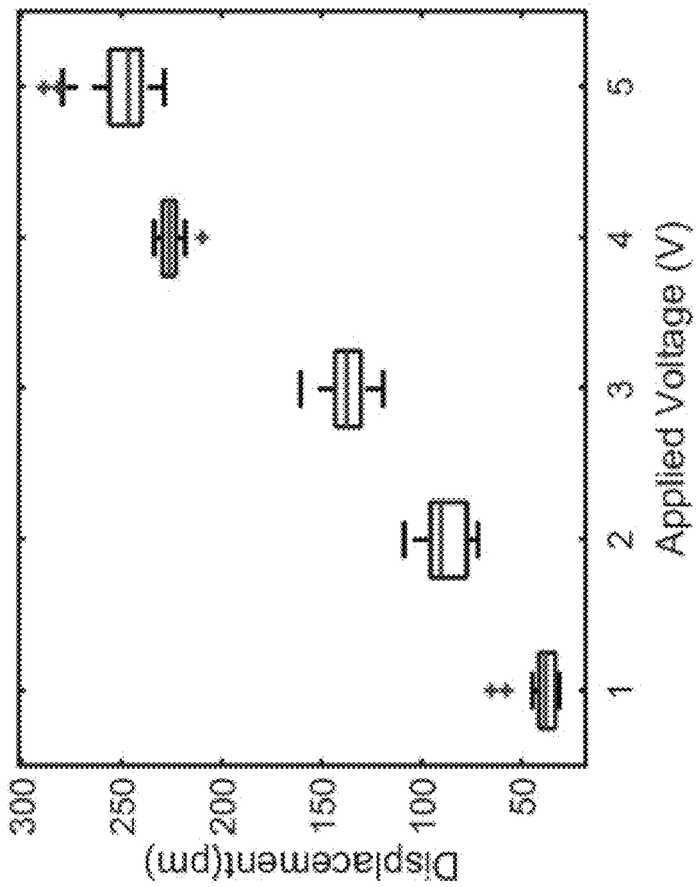
FIG. 26 shows an example of a box plot of surface displacement at the point of focus with different applied voltages.

The peak surface displacements at the center of the receive transducer as a function of applied voltages for a CW signal of 1.06 GHz is shown in FIG. 26. The expected linear behavior of the displacement with applied voltage is observed.

From the displacement data for 5V amplitude input, the average acoustic intensity $I_{avg}$, $$I_{avg} = \tfrac{1}{2} p v_l, \quad \text{EQ. (26)}$$

with ultrasonic pressure p=ρcv, was calculated to be 1.7 $KW/cm^2$ on the silicon dioxide surface located on the receive side. Thus, a very high intensity ultrasonic beam was realized from the GHz FZP microfluidic actuator.

Figures 27A, 27B, 27C:
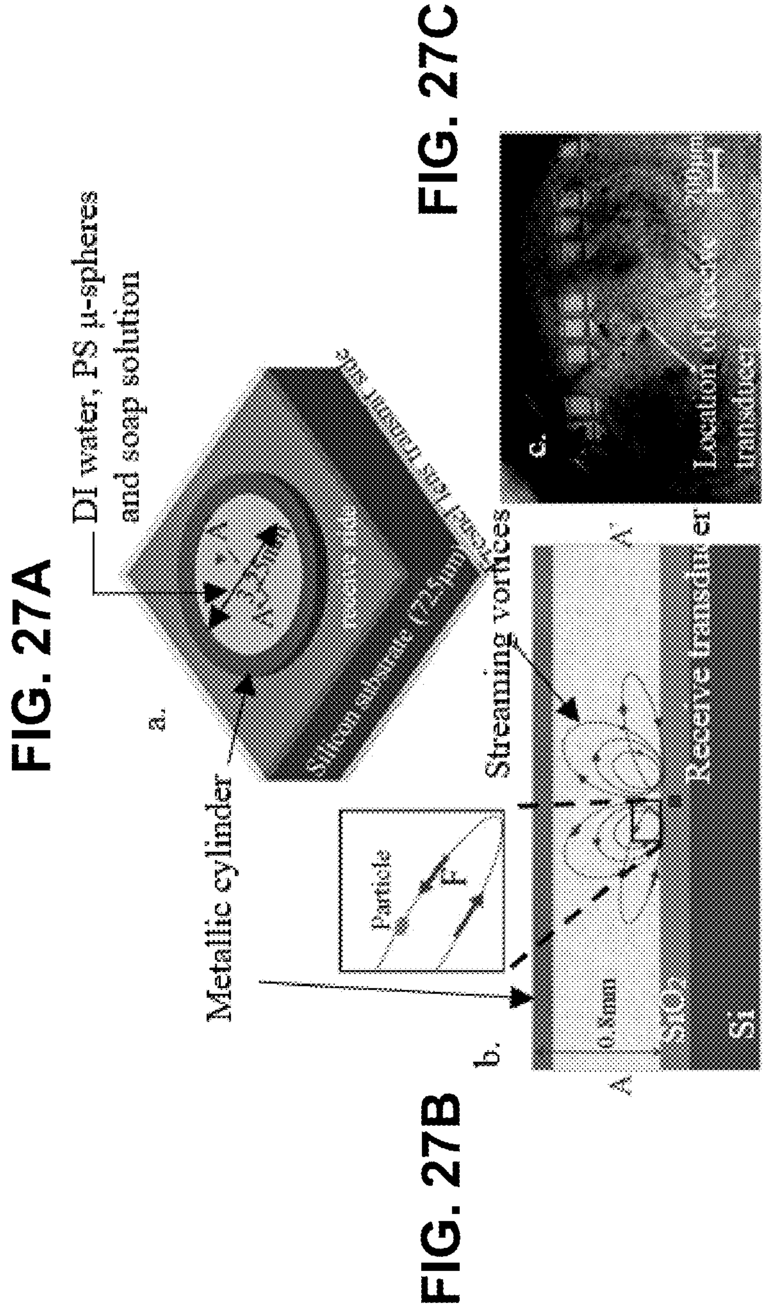
FIG. 27A shows an example of a 3D sketch of the microparticle actuator assembly.
FIG. 27B shows an example of a cross-sectional sketch showing the streaming vortices in liquid around the receive transducer.
FIG. 27C shows an example of streaming patterns observed around the circular transducer in the receive side.

A metal washer/cylinder was adhesively attached on the receive transducer side such that the receive transducer was centered within the washer. The inner diameter of the cylinder was 3.25 mm and the height was 0.8 mm. This formed a fluid capacity of 6.6 μl. The well formed by the cylinder was filled with a mixture of deionized water, polystyrene (PS) microspheres of 2 μm diameter, and soap solution for reducing surface tension between spheres and water. FIG. 27A shows the 3D model of the microfluidic actuator with the well and liquid mixture.

FIG. 26 shows an example of a box plot of surface displacement at the point of focus with different applied voltages. Twenty data points are plotted for each voltage.

The test setup was slightly modified for the microfluidic experiments; the input to the DUT came from the same VSG, but the DUT was now placed under a Keyence VW-9000 high speed microscope. Upon application of an input signal from the VSG to the transmit transducer, streaming vortices around the receive transducer, or the region of focus was observed. FIG. 27C shows an example of an image of the streaming patterns observed around the region of focus.

Figure 28:
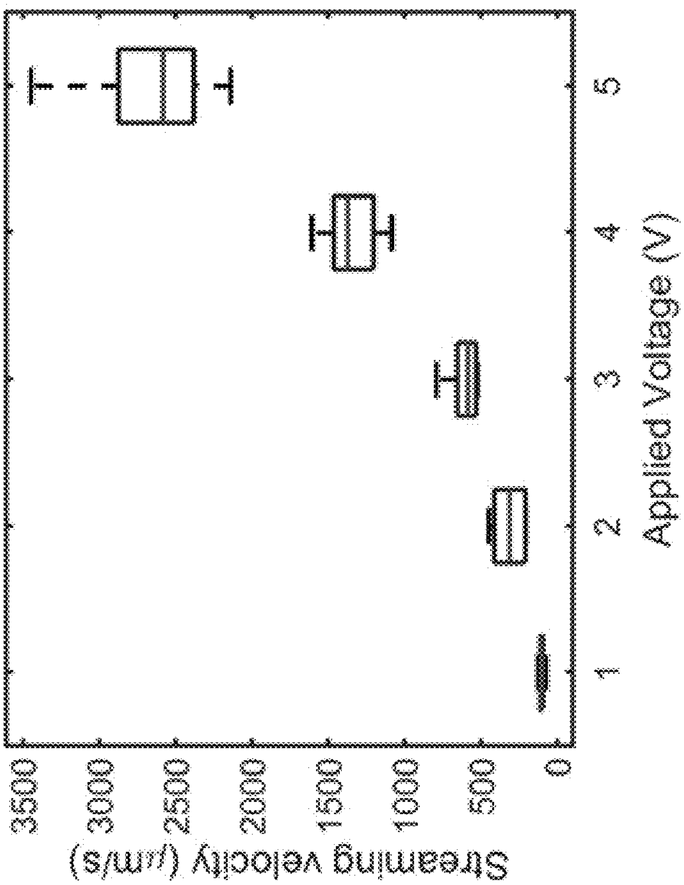
FIG. 28 shows an example of a box plot of streaming velocity versus applied voltage.

The amplitude of the input signal was varied from 1-5V, and the videos of the micro particle streaming movements were recorded. From these videos, the streaming velocity of the particles were estimated. The quadratic behavior of streaming velocity with applied voltage is shown in FIG. 28. Average streaming velocity of about 2636 μm/s was observed for an applied voltage of 5V. Such high streaming velocities were observed because of the enhanced radiation and streaming forces arising due to GHz frequency acoustic waves, and highly localized microbeam from the Fresnel lens configuration.

Described above is a GHz ultrasonic microfluidic actuator is presented. The device employs a thickness mode AlN piezoelectric transducer stack, which is in principle CMOS compatible. The thickness mode resonance of the FZP transducer generates bulk waves into the silicon substrate that focus constructively at the intended focal point, which is on the opposite side of the wafer. Although a smaller receive transducer was used here to measure the received signals electrically, the receive transducer is not required for microfluidic actuation. The focused ultrasonic wave displaces the silicon dioxide surface on the receive side which then propagates through the fluid.

Owing to high dissipation of the GHz ultrasonic field in water, a strong acoustic streaming force is generated; which pushes the fluid out and recirculates forming spherical vortex shell around the focal point. The highly defined focal point is an opportunity to create microfluidic systems with distributed fluidic sources controlled from the transmit transducer side.

FIG. 27A shows an example of a 3D sketch of the microparticle actuator assembly. FIG. 27B shows an example of a cross sectional sketch showing the streaming vortices in liquid around the receive transducer. FIG. 27C shows an example of a streaming patterns observed around the circular transducer in the receive side.

FIG. 28 shows an example of a box plot of streaming velocity versus applied voltage. Ten data points are plotted for each voltage.

The ability to change the frequency of the ultrasound and amplitude can also be used to spread the spatial extent of the force and its amplitude. Since the voltages required are CMOS compatible, and the fabrication process is also CMOS compatible, microfluidic samples placed on the receive side of the silicon die can be enabled easily with the ultrasonic actuator presented here. Further work is required to investigate the effect of microfluidic channel boundary conditions to contain the field and generate flow in channels.

In summary, a GHz actuator was designed, fabricated and tested for microparticle actuation. This can find applications in microparticle capturing, and biological assays requiring localized mixing and pumping. The device when integrated with CMOS can not only reduce the size and cost of the test setting drastically, but also enable digital control and automation of particle manipulation in a closed lab-on-chip environment.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

What is claimed is:

1. An ultrasonic microfluidic flow control device, comprising:

an array of ultrasonic transducers arranged on a first side of a complementary metal oxide semiconductor (CMOS) substrate, wherein the array of ultrasonic transducers is configured to direct ultrasonic energy into a microfluidic channel, and wherein the microfluidic channel is structured on a second side of the CMOS substrate;

one or more driver circuits arranged on the first side of the CMOS substrate, wherein each ultrasonic transducer is operatively associated with one of the one or more driver circuits, wherein each ultrasonic transducer is driven by a driver signal from the associated driver circuit, and wherein each ultrasonic transducer is configured to produce ultrasound in response to an electrical driving signal at a frequency above 100 MHz; and one or more electrical contacts associated with each ultrasonic transducer in the array of ultrasonic transducers, wherein the one or more electrical contacts associated with each ultrasonic transducer is configured to apply the driver signal from the associated driver circuit.

2. The ultrasonic microfluidic flow control device of claim 1, wherein each driver signal has a predetermined phase and amplitude or a predetermined duty cycle to cause pumping of a liquid in the microfluidic channel.

3. The ultrasonic microfluidic flow control device of claim 1, wherein each driver signal has a predetermined phase and amplitude or a predetermined duty cycle to cause the ultrasonic microfluidic flow control device to operate as a valve by allowing fluid to flow with low fluidic resistance in the microfluidic channel when the each driver signal is off and preventing fluid from flowing with high fluidic resistance when each driver signal is on.

4. The ultrasonic microfluidic flow control device of claim 1, wherein each driver signal has a predetermined phase and amplitude or a predetermined duty cycle to cause mixing of a liquid in the microfluidic channel.

5. The ultrasonic microfluidic flow control device of claim 1, wherein each of the array of ultrasonic transducers produces an ultrasound signal focused on the microfluidic channel.

6. The ultrasonic microfluidic flow control device of claim 1, wherein the ultrasonic microfluidic control device causes a microfluidic particle in the microfluidic channel to flow in the microfluidic channel.

7. The ultrasonic microfluidic flow control device of claim 1, wherein the array of ultrasonic transducers is a one-dimensional array.

8. The ultrasonic microfluidic flow control device of claim 7, wherein array of ultrasonic transducers is arranged as a 1×4 array.

9. The ultrasonic microfluidic flow control device of claim 1, wherein the array of ultrasonic transducers is a two-dimensional array.

10. The ultrasonic microfluidic flow control device of claim 1, wherein each ultrasonic transducer in the array of ultrasonic transducers occupies an area that is 40μ×40μ or 50μ×50μ with a gap between the ultrasonic transducers in the array of ultrasonic transducers of between 2μ and 50μ.

11. The ultrasonic microfluidic flow control device of claim 1, wherein each of the array of ultrasonic transducers responds to electrical signals at a frequency between 100 MHz and 10 GHz.

12. The ultrasonic microfluidic flow control device of claim 1, wherein each ultrasonic transducer in the array of ultrasonic transducers is a Fresnel type transducer.

13. The ultrasonic microfluidic flow control device of claim 1, wherein each ultrasonic transducer in the array of ultrasonic transducers is structured to cause ultrasound from each ultrasonic transducer to be focused at a predetermined point, and wherein the ultrasound from each ultrasonic transducer in the array of ultrasonic transducers is structured to constructively add in an ultrasonic amplitude or add in an ultrasonic power.

14. A method of microfluidic flow control, comprising:

focusing ultrasonic energy, from ultrasonic transducers in an array of ultrasonic transducers, onto a microfluidic channel; and driving, with a respective driver signal, each of the ultrasonic transducers in the array of ultrasonic transducers by a different driver circuit of one or more driver circuits to cause a change in microfluidic flow in the microfluidic channel according to a valve, a pump, or a mixer, wherein one or more electrical contacts associated with each ultrasonic transducer is configured to apply the respective driver signal from the different driver circuit;

the array of ultrasonic transducers being arranged on a first side of a complementary metal oxide semiconductor (CMOS) substrate, wherein the array of ultrasonic transducers is configured to direct ultrasonic energy into the microfluidic channel, and wherein the microfluidic channel is structured on a second side of the CMOS substrate;

the one or more driver circuits being arranged on the first side of the CMOS substrate, wherein each ultrasonic transducer is operatively associated with one of the one or more driver circuits, wherein each ultrasonic transducer is driven by a driver signal from the associated driver circuit, and wherein each ultrasonic transducer is configured to produce ultrasound in response to an electrical driving signal at a frequency above 100 MHz.

15. The method of microfluidic flow control of claim 14, wherein each ultrasonic transducer in the array of ultrasonic transducers occupies an area that is 40μ×40μ or 50μ× 50μ with a gap between the ultrasonic transducers in the array of ultrasonic transducers of between 2μ and 50μ.

16. The method of microfluidic flow control of claim 14, wherein each ultrasonic transducer in the array of ultrasonic transducers responds to electrical signals at a frequency between 100 MHz and 10 GHz.

17. The method of microfluidic flow control of claim 16, wherein each ultrasonic transducer in the array of ultrasonic transducers is structured to cause ultrasound from each ultrasonic transducer to be focused at a predetermined point, and wherein the ultrasound from each ultrasonic transducer in the array of ultrasonic transducers is structured to constructively add in an ultrasonic amplitude or add in an ultrasonic power.

18. The method of microfluidic flow control of claim 14, wherein each ultrasonic transducer in the array of ultrasonic transducers is a Fresnel type transducer.

19. A method of producing a microfluidic flow control device, comprising:

fabricating an array of ultrasonic transducers on a first side of a complementary metal oxide semiconductor (CMOS) substrate;

fabricating a microfluidic channel on the second side of the CMOS substrate, wherein the array of ultrasonic transducers is configured to direct ultrasonic energy into the microfluidic channel;

fabricating one or more driver circuits arranged on a first side of the CMOS substrate, wherein each ultrasonic transducer is operatively associated with one of the one or more driver circuits, wherein each ultrasonic transducer is configured to produce ultrasound in response to an electrical driving signal at a frequency above 100 MHz; and patterning one or more electrical contacts associated with each ultrasonic transducer in the array of ultrasonic transducers, wherein the one or more electrical contacts associated with each ultrasonic transducer is configured to apply a driver signal from an associated driver circuit.

20. The method of producing a microfluidic flow control device of claim 19, wherein each ultrasonic transducer in the array of ultrasonic transducers is configured to respond to the electrical driving signal at a frequency between 100 MHz and 10 GHz.

21. The method of producing a microfluidic flow control device of claim 19, wherein each ultrasonic transducer in the array of the ultrasonic transducers is a Fresnel type transducer.

* * * * *